(12) United States Patent
Dankberg

(10) Patent No.: US 9,014,620 B2
(45) Date of Patent: Apr. 21, 2015

(54) SATELLITE FLEET DEPLOYMENT

(71) Applicant: ViaSat, Inc., Carlsbad, CA (US)

(72) Inventor: Mark Dankberg, Encinitas, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 14/226,633

(22) Filed: Mar. 26, 2014

(65) Prior Publication Data

US 2014/0295752 A1    Oct. 2, 2014

Related U.S. Application Data

(63) Continuation of application No. 13/830,140, filed on Mar. 14, 2013, now Pat. No. 8,712,321.

(60) Provisional application No. 61/749,545, filed on Jan. 7, 2013.

(51) Int. Cl.
*H04B 7/185* (2006.01)
*H04B 7/204* (2006.01)

(52) U.S. Cl.
CPC ........ *H04B 7/18513* (2013.01); *H04B 7/18541* (2013.01); *H04B 7/2041* (2013.01); *H04B 7/18519* (2013.01)

(58) Field of Classification Search
CPC .......................................... H04B 7/185–7/216
USPC ................. 455/12.1–13.3, 427–430; 370/316
See application file for complete search history.

(56) References Cited

U.S. PATENT DOCUMENTS 6,173,178 B1    1/2001  Hammill
6,456,846 B2    9/2002  Norin et al.
7,142,809 B1    11/2006 Godwin
8,712,321 B1    4/2014  Dankberg
2004/0092257 A1*  5/2004  Chung et al. .............. 455/429
2006/0030261 A1  2/2006  Taur et al.
2008/0045146 A1  2/2008  Wahlberg et al.

FOREIGN PATENT DOCUMENTS

| EP | 1973240 A2 | 9/2008 |
| EP | 2753004 A3 | 8/2014 |
| WO | WO 2004010609 A1 | 1/2004 |
| WO | WO 2008038980 A1 | 4/2008 |

OTHER PUBLICATIONS

European Search Report dated Jul. 15, 2014, EP Application No. 14150251.8, 7 pgs.

* cited by examiner

*Primary Examiner* — Raymond Dean
(74) *Attorney, Agent, or Firm* — Holland & Hart, LLP

(57) ABSTRACT

Methods, systems, and devices are described for managing satellite communications through the deployment of a fleet of multi-beam satellites serving overlapping and non-overlapping spot beams. In these methods, systems, and devices, a first communication service associated with a relatively wider spot beam of a first satellite is provided to a first coverage area having multiple terminals. A second communication service associated with a relatively narrower spot beam (e.g., high-gain spot beam) of a second satellite is provided to a second coverage area located within the first coverage area. A subset of terminals located within the second coverage area is identified, and the terminals of the identified subset are transitioned from the first communication service of the wide spot beam of the first satellite to the second communication service of the high-gain spot beam of the second satellite.

20 Claims, 25 Drawing Sheets

SATELLITE FLEET DEPLOYMENT

CROSS REFERENCES

The present application is a continuation of U.S. patent application Ser. No. 13/830,140, filed on Mar. 14, 2013, and entitled "Satellite Fleet Deployment;" which claims priority benefit of U.S. provisional patent application Ser. No. 61/749,545, filed on Jan. 7, 2013, and entitled "Satellite Fleet Deployment;" the disclosures of which are incorporated herein in its entirety for all purposes.

BACKGROUND

The present disclosure relates to wireless communications in general, and in particular, to broadband satellite communications networks.

As demand for broadband communications continues to grow around the world, broadband satellite communication networks have been deployed and continue to be developed to address that demand.

SUMMARY

Embodiments are directed to a system including a fleet of multi-beam satellites, each satellite being configured to provide at least one communication service over at least one fixed-location spot beam; and a fleet management device communicatively coupled to the satellites. The fleet of satellites may include an initially deployed first multi-beam satellite providing a first communication service to a plurality of first satellite beam coverage regions via a plurality of fixed location beams and a later deployed second multi-beam satellite providing a second communication service to a plurality of second satellite beam coverage regions via a plurality of fixed location beams. The plurality of second satellite beam coverage regions may include a first elevated demand region located at least partially within a first one of the plurality of first satellite beam coverage regions and a second elevated demand region located at least partially within a second one of the plurality of first satellite beam coverage regions, where the elevated demand regions are associated with elevated levels of communication service demand. The fleet management device may be configured to transition a first plurality of terminals from the first communication service to the second communication service, the first plurality of terminals located in the first elevated demand region and initially associated with a first fixed location beam of the first satellite, such that the first plurality of terminals are then associated with a first fixed location beam of the second satellite, and transition a second plurality of terminals from the first communication service to the second communication service, the second plurality of terminals located in the second elevated demand region and initially associated with a second fixed location beam of the first satellite, such that the second plurality of terminals are then associated with a second fixed location beam of the second satellite.

In some embodiments, the first one of the plurality of first satellite beam coverage regions and the second one of the plurality of first satellite beam coverage regions overlap or are the same region. In some embodiments, a first portion of a system bandwidth is allocated to the first fixed location beam of the first satellite a bandwidth allocated to the first fixed location beam of the second satellite includes at least the first portion of the system bandwidth. The plurality of fixed location beams of the second satellite may include a third fixed location beam that services a satellite beam coverage region that overlaps at least partially with the first elevated demand region, where a bandwidth allocated to the third fixed location beam includes at least the first portion of the system bandwidth of an orthogonal polarization relative to the first fixed location beam of the second satellite. The plurality of fixed location beams of the second satellite may include a fourth fixed location beam servicing a satellite beam coverage region that overlaps at least partially with the first elevated demand region and the satellite beam coverage region associated with the third fixed location beam, where a bandwidth allocated to the fourth fixed location beam includes at least the first portion of the system bandwidth of a same polarization as the third fixed location beam, and where the third fixed location beam and the fourth fixed location beam are allocated orthogonal time resources. In embodiments, substantially all of the plurality of second satellite coverage regions of the second satellite overlap with one or fewer other coverage regions of the plurality of second satellite coverage regions.

In some embodiments, the transition of at least one terminal of the first plurality of terminals to the second communication service associated with the second beam of the second satellite is performed in response to a customer request for the second communication service. Additionally or alternatively, the transition of at least one terminal of the first plurality of terminals to the second communication service associated with the second beam of the second satellite may be performed at the direction of a satellite system operator.

In some embodiments, the fleet management device is configured to compare a signal strength of the first fixed location beam of the first satellite to a signal strength of the first fixed location beam of the second satellite near a fringe area of the first fixed location beam of the second satellite and select one of the first satellite and the second satellite for communicating with a selected terminal located near the fringe area of the first fixed location beam of the second satellite based on the comparison. The fleet management device may be configured to determine an available capacity of the first satellite and an available capacity of the second satellite and select one of the first satellite and the second satellite for communicating with a terminal located near a fringe area of the first fixed location beam of the second satellite based on the available capacity of the first satellite and the available capacity of the second satellite.

Some embodiments are directed to a method of managing satellite communications that includes providing a first communication service to a plurality of first satellite coverage regions via a plurality of fixed location beams of an initially deployed first satellite and providing a second communication service to a plurality of second satellite coverage regions via a plurality of fixed location beams of a later deployed second satellite. The second plurality of coverage regions may include a first elevated demand region located at least partially within a first one of the plurality of first satellite coverage regions, and a second elevated demand region located at least partially within a second one of the plurality of first satellite coverage regions, where the elevated demand regions are associated with elevated levels of communication service demand. The method may include transitioning a first plurality of terminals from the first communication service to the second communication service, the first plurality of terminals located in the first elevated demand region and initially associated with a first fixed location beam of the first satellite, such that the first plurality of terminals are then associated with a first fixed location beam of the second satellite, and transitioning a second plurality of terminals from the first communication service to the second communication service, the second plurality of terminals located in the second elevated demand region and initially associated with a second fixed location beam of the first satellite, such that the second plurality of terminals are then associated with a second fixed location beam of the second satellite.

Some embodiments are directed to a gateway system for managing satellite communications including a first beam service module in communication with an initially deployed first satellite, the first beam service module configured to provide a first communication service to a plurality of first satellite coverage regions via a plurality of fixed location beams of the first satellite and a second beam service module in communication with a later deployed second satellite, the second beam service module configured to provide a second communication service to a plurality of second satellite coverage regions via a plurality of fixed location beams of the second satellite. The second plurality of coverage regions may include a first elevated demand region located at least partially within a first one of the plurality of first satellite coverage regions, and a second elevated demand region located at least partially within a second one of the plurality of first satellite coverage regions, where the elevated demand regions are associated with elevated levels of communication service demand. The gateway system may include a data routing module configured to selectively route data between a network, the first beam service module and the second beam service module, and a service transition module configured to update the data routing module to transition a first plurality of terminals from the first communication service to the second communication service, the first plurality of terminals located in the first elevated demand region and initially associated with a first fixed location beam of the first satellite, such that the first plurality of terminals are then associated with a first fixed location beam of the second satellite, and transition a second plurality of terminals from the first communication service to the second communication service, the second plurality of terminals located in the second elevated demand region and initially associated with a second fixed location beam of the first satellite, such that the second plurality of terminals are then associated with a second fixed location beam of the second satellite.

Some embodiments are directed to a system for managing satellite communications including a data store configured to store data associating terminals within a plurality of first satellite coverage regions with a first communication service provided by an initially deployed first satellite via a plurality of fixed location beams, and a network configuration module configured to identify a first subset of the terminals located within a first elevated demand region located at least partially within a first one of the plurality of first satellite coverage regions and identify a second subset of the terminals located within a second elevated demand region located at least partially within a second one of the plurality of first satellite coverage regions, where the elevated demand regions are associated with elevated levels of communication service demand. The network configuration module may be configured to update the data of the data store to associate a first plurality of terminals of the first subset of the terminals with a second communication service associated with a later deployed second satellite having a plurality of fixed location beams, the first plurality of terminals served by a first fixed location beam of the second satellite after being associated with the second communication service, and associate a second plurality of terminals of the second subset of the terminals with the second communication service, the second plurality of terminals served by a second fixed location beam of the second satellite after being associated with the second communication service. The system may include a routing configuration module configured to cause network data to be routed between a network and each terminal using one of the first communication service and the second communication service based on the data of the data store.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

The useful operational life of a broadband communication satellite may be 10 to 15 years or more, while it may only require about 3 years to design, build and launch a satellite. The opportunity exists, therefore, to provide a fleet of satellites that cooperatively meet the communication demand of a target area.

Communication satellites have evolved from covering wide areas with a single beam to covering wide areas with a number of spot beams. A spot beam is a satellite signal focused on a limited geographic area of the Earth. By reducing the coverage area of the beam, a more directional antenna may be used by the satellite to transmit data to and receive data from a region of the Earth. Because the gain of an antenna is typically proportional to its directionality, a spot beam may be transmitted at a higher gain than a legacy satellite signal with a wider coverage area at the same amount of power. This higher gain can produce better signal-to-noise (SNR) ratio at the consumer terminal, which allows for higher rates of data transfer between the satellite and terminals. Also, the relatively small coverage areas of spot beams allow for frequency reuse with limited inter-beam interference, thereby providing for even greater increases in data throughput at a satellite.

While highly directional spot beams can be very useful in areas with a high demand for satellite data, it may be more efficient to serve lower-demand areas with one or more beams having wider coverage areas and lower total throughput. For example, some areas may not have a sufficient number of subscriber terminals to justify the allocation of spot beam resources to those areas.

Figure 1:
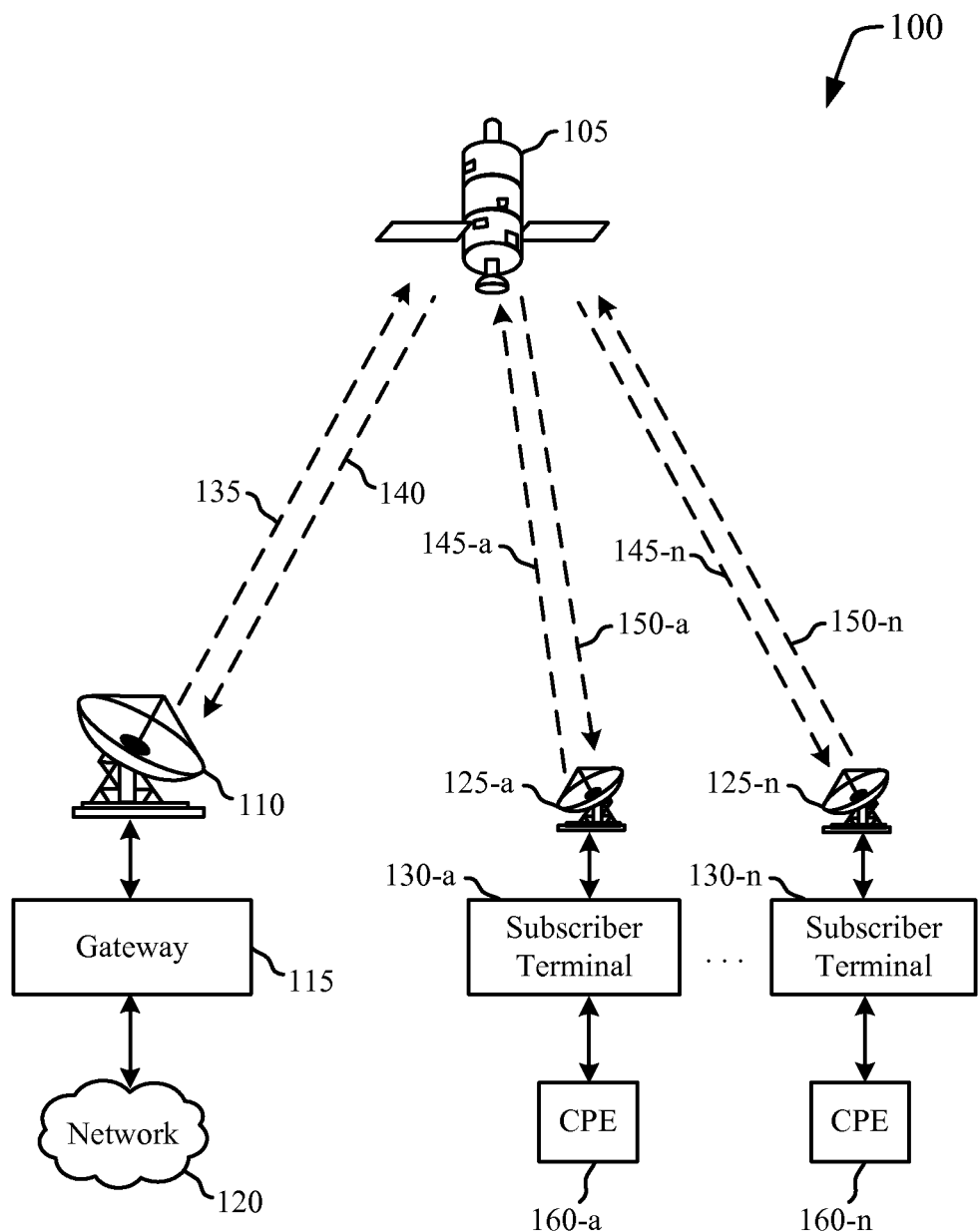
FIG. 1 is a block diagram of an example satellite communication system including components configured according to various embodiments of the principles described herein.

FIG. 1 is a simplified diagram of an example satellite communications system 100 in which the principles included herein may be described. The satellite communications system 100 includes a network 120, such as the Internet, interfaced with a gateway system 115. The gateway system 115 is configured to communicate with one or more subscriber terminals 130 via a satellite 105. The satellite communications system 100 may be any suitable type of satellite system, including a geostationary satellite system or low earth orbit (LEO) satellite system. The network 120 may be any suitable type of network and may connect the gateway system 115 with other gateway systems, which may also be in communication with the satellite 105. Alternatively, a separate network linking gateways and other nodes may be employed to cooperatively service user traffic.

The gateway system 115 may be a device or system that provides an interface between the network 120 and the satellite 105. The gateway system 115 may be configured to receive data and information directed to one or more subscriber terminals 130. The gateway system 115 may be configured to format the data and information along with control signals for delivery via the satellite 105 to the respective subscriber terminal 130. The gateway system may format the data and information using a modulation and coding scheme (MCS) that may be custom to the satellite or similar to others in the industry. Multi-beam satellites may also be used with Adaptive Coding and Modulation (ACM) or Variable Coding and Modulation (VCM). Similarly, the gateway system 115 may also be configured to receive signals from the satellite 105 (e.g., from one or more subscriber terminals 130) that are directed to a destination in the network 120.

The gateway system 115 may use an antenna 110 to transmit signals to and receive signals from the satellite 105. In one embodiment, a geostationary satellite 105 is configured to receive signals from the antenna 110 and within the frequency band and specific polarization transmitted. In one embodiment, the satellite 105 operates in a multi-beam mode, transmitting a number (e.g., typically 20-100, etc.) of spot beams each directed at a different region of the earth. This can allow coverage of a relatively large geographical area and frequency re-use within the covered area. Frequency re-use in multi-beam satellite systems permits an increase in capacity of the system for a given system bandwidth. In many embodiments, the spot beams are fixed location spot beams, meaning that the angular beamwidth and coverage area for each spot beam does not intentionally vary with time.

With such a multi-beam satellite, there may be a number of different signal switching configurations, allowing signals from a single gateway system 115 to be switched between different spot beams. The signals transmitted from the satellite 105 may be received by one or more subscriber terminals 130 via a respective subscriber antenna 125. Similarly, signals transmitted from the subscriber terminals 130 via the respective subscriber antennas 125 may be received at the satellite 105 and directed to the gateway system 115 from the satellite 105.

Each spot beam of the satellite 105 supports the terminals 130 within its coverage area (e.g., providing uplink and downlink resources). Frequency re-use between spot beams may be provided by assigning one, or more, ranges of frequencies (which may be referred to as channels) to each spot beam and/or by use of orthogonal polarizations. A particular frequency range and/or polarization may be called a "color," and frequency re-use in a tiled spot beam satellite system may be according to color. The coverage of different beams may be non-overlapping or have varying measures of overlap. In one embodiment, spot beams of the satellite 105 may be tiled and partially overlapping to provide complete or almost complete coverage for a relatively large geographical area (e.g., the Contiguous United States (CONUS), etc.) where partially overlapping or adjacent beams use different ranges of frequencies and/or polarizations. Each beam may contain a gateway, user terminals, or a gateway and user terminals. Gateway beams and user beams may also be separated from each other to allow frequency reuse between gateway and user beams.

Figure 2A:
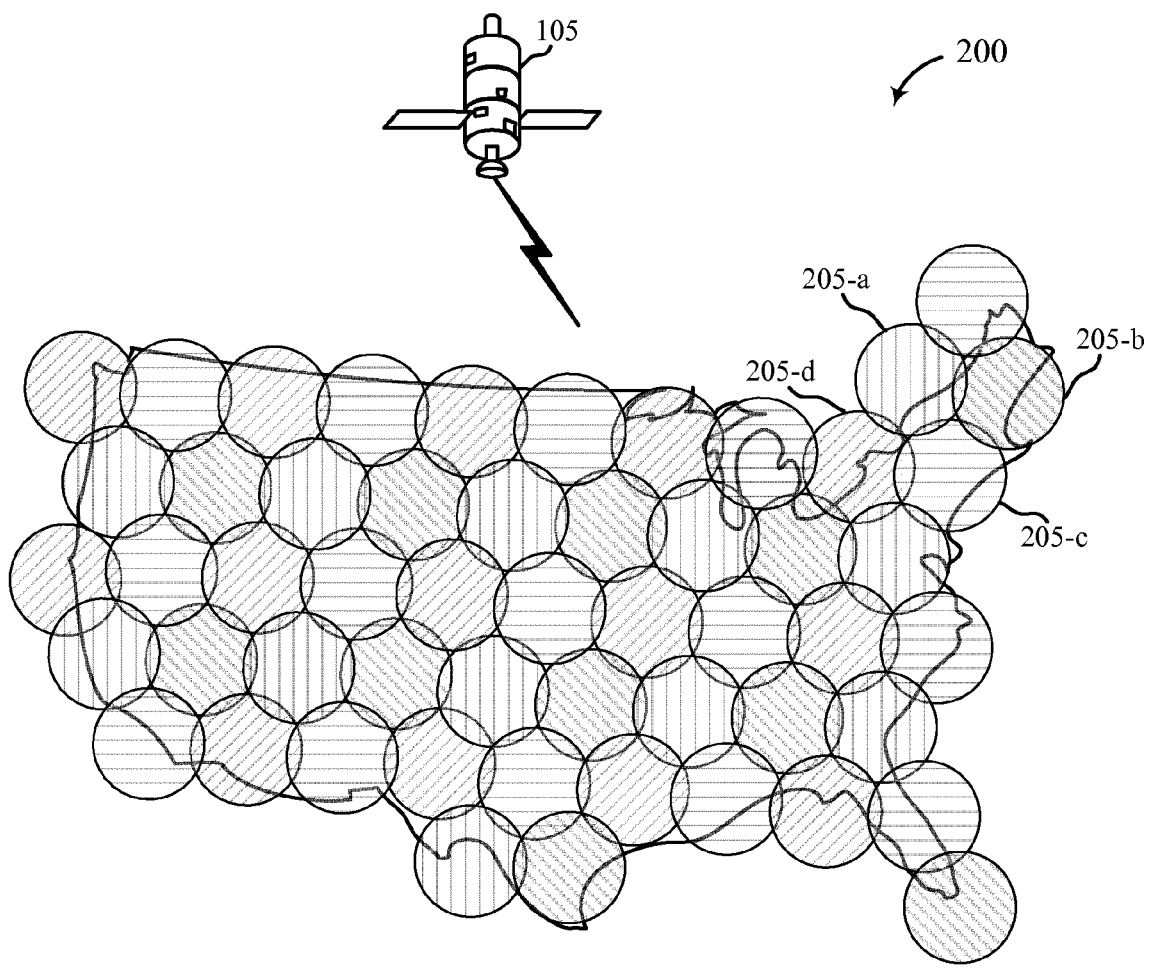
FIG. 2A is a diagram of a system providing tiled spot beam coverage for a region using a four-color frequency re-use pattern according to various embodiments of the principles described herein.
Figure 2B:
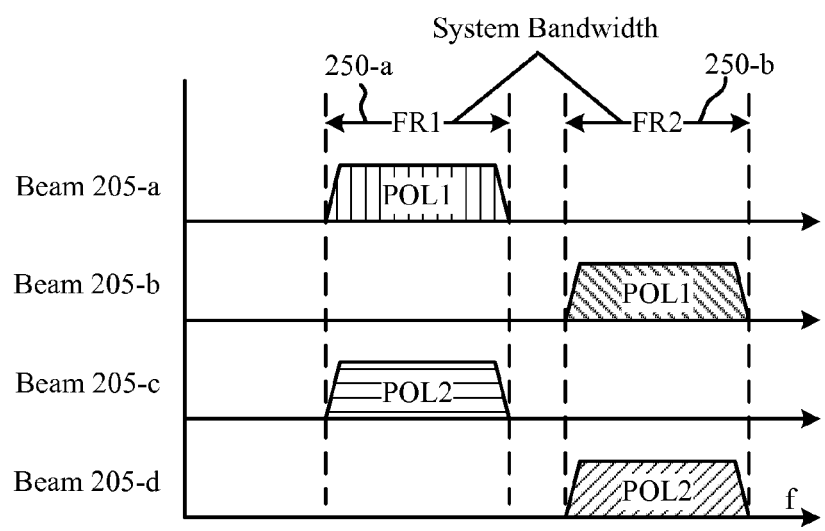
FIG. 2B illustrates an example frequency re-use scheme where the system resources are split into four colors according to two frequency ranges and orthogonal polarizations according to various embodiments of the principles described herein.

FIG. 2A is a diagram of a system 200 providing coverage for the CONUS region with tiled spot beams and frequency re-use. In one embodiment, the system 200 utilizes a four-color frequency re-use pattern where spot beams 205-a, 205-b, 205-c, and 205-d each use a different beam color. For example, the system 200 may use a particular system bandwidth and the tiled spot beams 205 may each use portions of the system bandwidth and a polarization direction. FIG. 2B illustrates an example frequency re-use scheme where the system resources (system bandwidth 250, polarization, etc.) are split into four colors according to two frequency ranges and orthogonal polarizations. The system bandwidth 250 may be contiguous or non-contiguous as illustrated by frequency blocks FR1 250-a and FR2 250-b of FIG. 2B. Two colors may overlap in bandwidth if their polarizations are orthogonal as illustrated by polarizations POL1 and POL2 (e.g., horizontal and vertical, left-hand circularly polarized (LHCP) and right-hand circularly polarized (RHCP), etc.). Returning to FIG. 2A, the tiled spot beams 205 may be assigned colors such that two beams of the same color do not overlap. For example, beams 205-a, 205-b, 205-c, and 205-d may be assigned to color 1 (FR1, POL1), color 2 (FR2, POL1), color 3 (FR1, POL2), and color 4 (FR2, POL2), respectively. While FIGS. 2A and 2B illustrate one frequency re-use scheme, other frequency re-use schemes may be used.

For spot beam satellite systems, the number of spot beams may be determined by practical limits of payload capacity on the satellite and/or launch vehicles, and/or on the power budget of the satellite 105. Typically, spot beam satellites may support 20-150 spot beams providing coverage for a service area that may be several thousand miles in diameter. Each spot beam may support one or more signals of modulated radio waves that may be detected and demodulated by terminals located throughout the coverage area of the spot beam.

The system 200 illustrated in FIG. 2A may be called a contiguous coverage spot beam system, where the coverage of the service zone by the tiled spot beams (e.g., CONUS, etc.) is contiguous or substantially contiguous. Typically, spot beams for contiguous coverage spot beam systems are approximately the same size. For example, while spot beam coverage areas of a contiguous coverage spot beam system may be different sizes and/or dimensions either based on the satellite azimuth or intentionally elongated in one direction (e.g., using shaped antenna systems, beam-shaping techniques, etc.), each beam may have an angular beamwidth that is approximately equal if normalized for beam-shaping. For simplicity, such a system may be referred to herein as a tiled spot beam system, and beams of the tiled spot beam system may be referred to as tiled spot beams.

In embodiments, a satellite fleet system includes multiple spot-beam satellites providing service within a service zone, where later deployed satellites provide targeted service to areas having elevated demand using more narrowly focused, higher gain spot beams. In one embodiment, a satellite system includes an initially deployed satellite that provides contiguous coverage for a portion of a service area using tiled spot beams. Later deployed satellites may provide targeted service to elevated demand regions within the service zone using more narrowly focused beams that overlap partially or fully with the tiled spot beams of the initially-deployed satellite. Beams of the later deployed satellites may be different sizes and may overlap one another either partially or fully.

Figure 3:
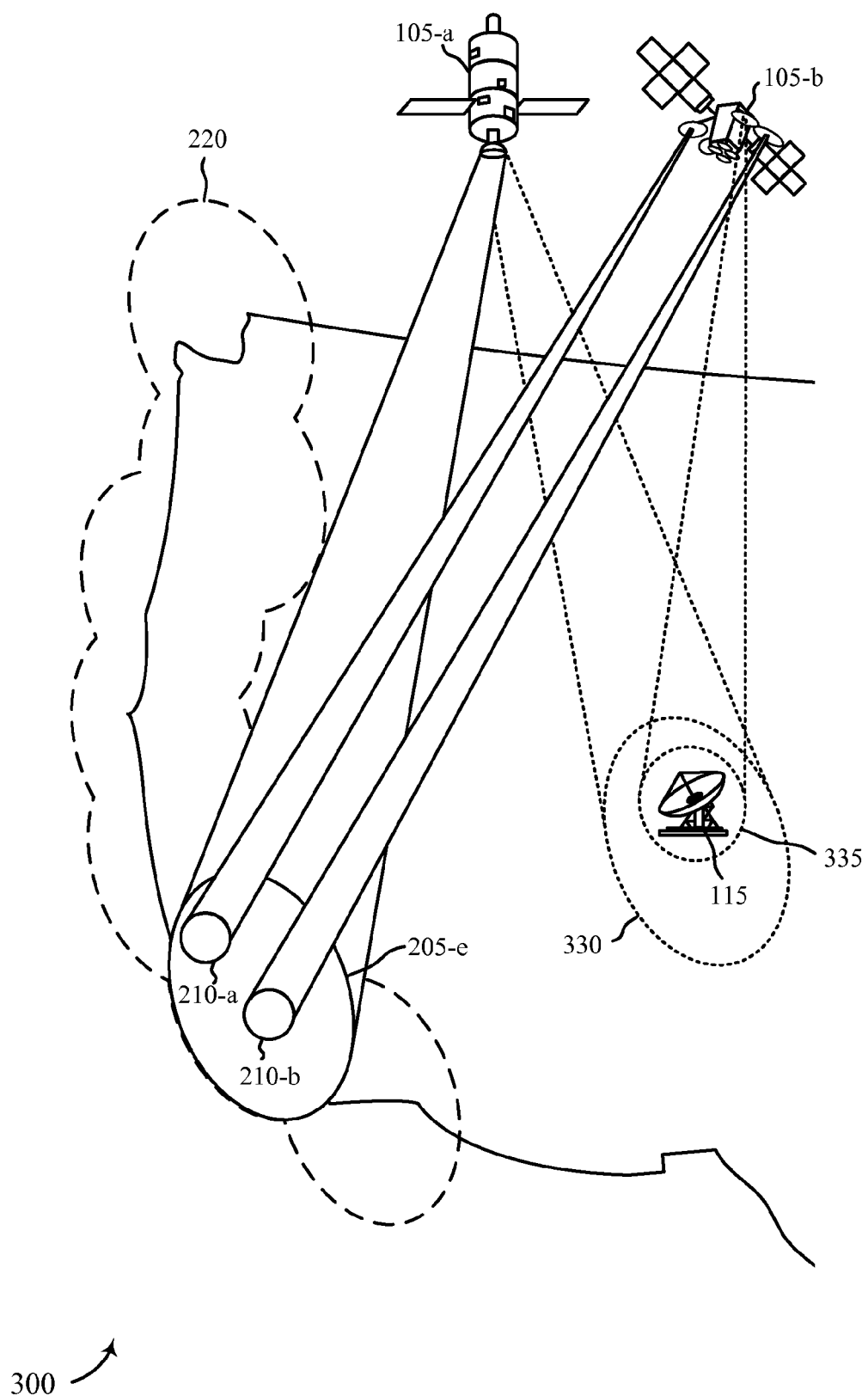
FIG. 3 is a block diagram of a portion of an example satellite communication system according to various embodiments of the principles described herein.

FIG. 3 is a simplified diagram of a system 300 of satellites 105 providing different types of beams to implement a number of communication services. The satellites 105 of the present figure may be examples of the satellite 105 described above with respect to FIGS. 1 and/or 2A. In the present example, an initially-deployed satellite 105-a may provide contiguous or substantially contiguous coverage within service zone 220 using relatively wide adjacent and/or overlapping spot beams 205 including wide spot beam 205-e and other wide spot beams 205 (not numbered). Downlink and/or uplink service to wide spot beams 205 may be provided by the first satellite 105-a via one or more gateways 115 within the coverage area of a feeder beam 330. Feeder beams 330 may overlap with service zone 220, or, as pictured in FIG. 3, may be outside of service zone 220. Wide spot beam 205-e may have a coverage area including a region of the western United States and may have a coverage area having an approximate diameter of 200-500 miles.

While the relatively large coverage area of the wide spot beam 205-e may be useful for a number of applications, certain compromises in data throughput and signal reception may be associated with a larger beam. For instance, in the coverage area of the wide spot beam 205-e, each receiver terminal may receive the same forward link signal of the beam as the other receivers associated with the wide spot beam 205-e. Thus, a signal transmitted in the beam may not carry different data to different regions located within the coverage area of the beam at the same time. Similarly, separate subscriber terminals transmit to the first satellite 105-a using different resources (e.g., frequency, time, etc.) of the return link signal for wide spot beam 205-e. Accordingly, the total data throughput of a frequency (or band of frequencies) may be limited by the inability to simultaneously reuse the frequency (or band of frequencies) used by the wide spot beam within the coverage area of overlapping and/or adjacent beams. Moreover, antenna directionality is typically inversely proportional to antenna gain. As such, an antenna used to transmit data in a wider beam typically has a relatively lower gain than more directional antennas used for narrower beams, and this lower gain can reduce signal reception and data throughput at terminals on the earth's surface.

In certain examples, the capacity (e.g., measured in bits-per-second) of wide spot beam 205-e may be largely utilized to serve hot spot clusters of terminals in cities or other high-density locations. The capacity of the wide spot beam may be a function of various parameters, including but not limited to: frequency bandwidth available for use by the beam; SNR or signal-to-interference plus noise ratio (SINR) at the individual terminals and gateway; modulation and coding formats (e.g., MCS, etc.); multiple access scheme; and/or other factors. These hot spot clusters of terminals may result in localized areas of higher-than average demand. Because the total capacity for transmitting and receiving data over the wide spot beam 205-e can be shared among each of the terminals communicating over the wide spot beam 205-e, these localized clusters of high demand may tax the amount of capacity available over the wide spot beam 205 to other terminals within the coverage area of the wide spot beam 205. This congestion may result in data bottlenecks for the terminals.

To increase capacity, a second multi-beam satellite 105-b may be deployed that provides one or more spot beams to high-density locations within the service area 220. The second satellite 105-b may also be a geostationary satellite and may be deployed to an orbital slot providing sufficient angular separation from the first satellite 105-a to make inter-satellite interference negligible. The second satellite 105-b may use fixed location spot beams and may transmit and receive to user terminals in the same geographic areas serviced by the first satellite 105-a using the same or substantially overlapping spectrum resources as the first satellite 105-a because of the angular separation between the satellites. The second satellite may service the one or more high-gain spot beams in the service area 220 via the same gateway 115 (e.g., via separate antennas, etc.) via feeder beam 335. Additionally or alternatively, the second satellite 105-b may provide service via one or more other gateways co-located with gateway 115 or in other locations. As with gateways servicing the first satellite 105-a, gateways 115 for the second satellite 105-b may be inside or outside service zone 220.

The second satellite 105-b may employ one or more high-gain spot beams 210 that service coverage areas within the coverage areas of the first satellite 105-a. While only two high-gain spot beams 210 are shown in FIG. 3 for the sake of clarity, the second satellite 105-b may in some examples transmit and receive data over dozens of high-gain spot beams 210 within the coverage area of satellite 105-a. One or more of the high-gain spot beams 210 may be directed to the hot spot clusters of high demand. Satellite communications for terminals that are located within the coverage area of one of the new spot beams 210 may be transitioned from the wide spot beam 205-e to the new high-gain spot beam 210. By transitioning terminals in the hot spot clusters of high demand from the wide spot beam 205-e to the high-gain spot beams 210 of the second satellite, capacity for transmitting and receiving data over the wide spot beam 205-e may be freed up.

This newly available capacity within the wide spot beams 205 may be dedicated to the addition of new subscriber terminals, particularly subscriber terminals that are outside the coverage area of the high-gain spot beams 210. Thus, by servicing areas of low demand density with the wider wide spot beams 205 and areas of higher demand density with the high-gain spot beams 210, a more efficient distribution of satellite resources may be achieved.

It should be understood that while FIG. 3 illustrates a wide spot beam 205-e with a coverage area of a region of the western contiguous United States and high-gain spot beams 210 having coverage areas with a diameter of approximately one hundred miles or less, other sizes of beams may be used. Thus, in certain examples, the aggregate coverage area may correspond to the entire CONUS area and the high-gain spot beams 210 may have coverage areas corresponding to one or more states within the United States. In other examples, the wide spot beams 205 may have a coverage size of one or more states, and the high-gain spot beams 210 within the wide spot beams 205 may have coverage areas corresponding to one or more metropolitan regions. In still other examples, a wide spot beam 205 may have a coverage area of a metropolitan region, and a high-gain spot beam 210 within that wide spot beam 205 may have a coverage area of a region of high population density within the metropolitan region.

For the purposes of the present disclosure and appended claims, the term "wide spot beam" is to be broadly construed as referring to a spot beam having a coverage area within which one or more spot beams having a smaller angular beamwidth may be deployed. For the purposes of the present disclosure and the appended claims, the term "high-gain spot beam" is to be broadly construed as referring to a beam having a coverage area smaller than wide spot beams served by a multi-satellite system (e.g., typically with a diameter between 0 and about 500 miles).

By deploying the high gain spot beams 210 within the coverage area of the wide spot beam 205-e, data throughput to certain regions within the coverage area of the wide spot beam 205-e may increase. Additionally, the high-gain spot beams 210 may enable the second satellite 105-b to simultaneously provide different data to different coverage areas over the same frequencies. Regions outside of the coverage areas of the high-gain spot beams 210 may still receive data from the first satellite 105-a over the wide spot beam 205-e.

According to one possible strategy for managing increased consumer demand, when a high-gain spot beam 210 is deployed within the coverage area of a wide spot beam 205, the high-gain spot beams 210 may create capacity for high-demand regions to add new terminals. The new terminals may communicate with the newly deployed high-gain spot beams 210, and the existing terminals may continue to communicate with the wide spot beam. In this scenario, the wide spot beam 205 may remain congested with data traffic because all of the existing terminals continue to remain associated with the wide spot beam 205.

However, embodiments of the present disclosure resolve this issue by providing systems and methods for reducing the congestion of the wide spot beam 205. As alluded to above, when a high-gain spot beam 210 is deployed to an area of high demand for satellite communications, the existing terminals within the coverage area of the high-gain spot beam 210 may be transitioned the high-gain spot beam 210 instead of the wide spot beam 205. Existing terminals outside the coverage area of the high-gain spot beam 210 may remain in communication with the wide spot beam 205. New terminals within the coverage area of the high-gain spot beam 210 may be added to the high-gain spot beam 210. Additionally, the capacity of the wide spot beam 205 freed up by terminals transitioned to the high-gain spot beam 210 may be used to add new terminals outside the coverage area of the high-gain spot beam 210 but still within the coverage area of the wide spot beam 205. Thus, transitioning existing members within the coverage of the high-gain spot beam 210 from the wide spot beam 205 to the high-gain spot beam 210 may result in not only an increased total data throughput capacity, but a more efficient allocation of the resources provided by the first satellite and the second satellite among the different terminals. The terminals within the coverage area of the high-gain spot beam 210 may be transitioned upon request for upgraded service by users associated with the terminals, or some or all terminals within the coverage area of the high-gain spot beam 210 may be transitioned to be provided service through the high-gain spot beam 210 without action on the part of the users (e.g., at the direction of the satellite system operator).

In one embodiment, Quality of Service (QoS) guarantees for satellite communication services provided by each of the first satellite 105-a and the second satellite 105-b are improved by transitioning terminals within the high-demand regions from service provided by the first satellite 105-a to service provided by the second satellite 105-b. For example, QoS for satellite communication services within a wide spot beam 205 may be influenced by the overall beam capacity (e.g., in Gbps, etc.) divided by the number of terminals served by the spot beam and may be based on statistical multiplexing of terminals.

Figure 4A:
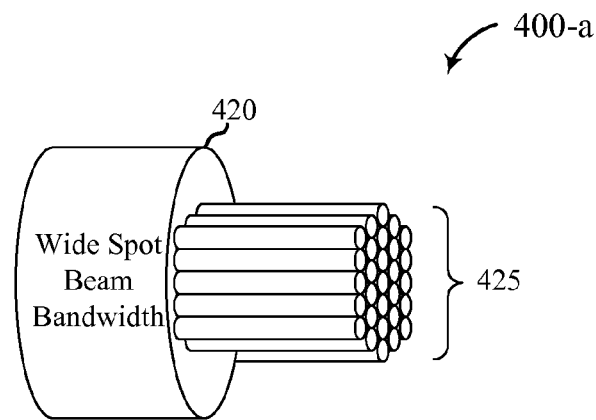
FIG. 4A is a simplified diagram of provisioned satellite communication service for a number of terminals according to various embodiments of the principles described herein.

FIG. 4A is a simplified diagram 400-a of provisioned satellite communication service from the first satellite 105-a for a number of terminals. In this example, the first satellite beam bandwidth 420 may be provisioned by statistical multiplexing of terminals where provisioned service (e.g., rate-based, volume-based, time-based, etc.) for individual terminals is illustrated by provisioned service levels 425. Only a portion of the blocks of provisioned service levels 425 are shown in FIG. 4A for simplicity and, as described in more detail below, the instantaneous demand for all terminals serviced with the beam may exceed the beam capacity 420 because of statistical multiplexing. For simplicity, FIG. 4A shows only terminals provisioned for one service level for service provided by the wide spot beam 205. However, terminals provided communication service from wide spot beam 205 may be provisioned with different service levels, in some embodiments.

When some or all terminals within high-demand regions of the wide spot beam 205 are transitioned to a high-gain spot beam 210, service provided by wide spot beam 205 can be re-provisioned for a higher QoS. The high-gain spot beam may, by virtue of the higher gain beam, provide higher capacity (e.g., higher MCS, etc.) than the wide spot beam 205 over the same spectrum resources. Thus, the communication service provided to terminals within the high-demand regions corresponding to the high-gain spot beams 210 may be provisioned for higher QoS, and, at the same time, the wide spot beam 205 now serves fewer terminals and each terminal may be provided with a higher statistically multiplexed QoS guarantee.

Figure 4B:
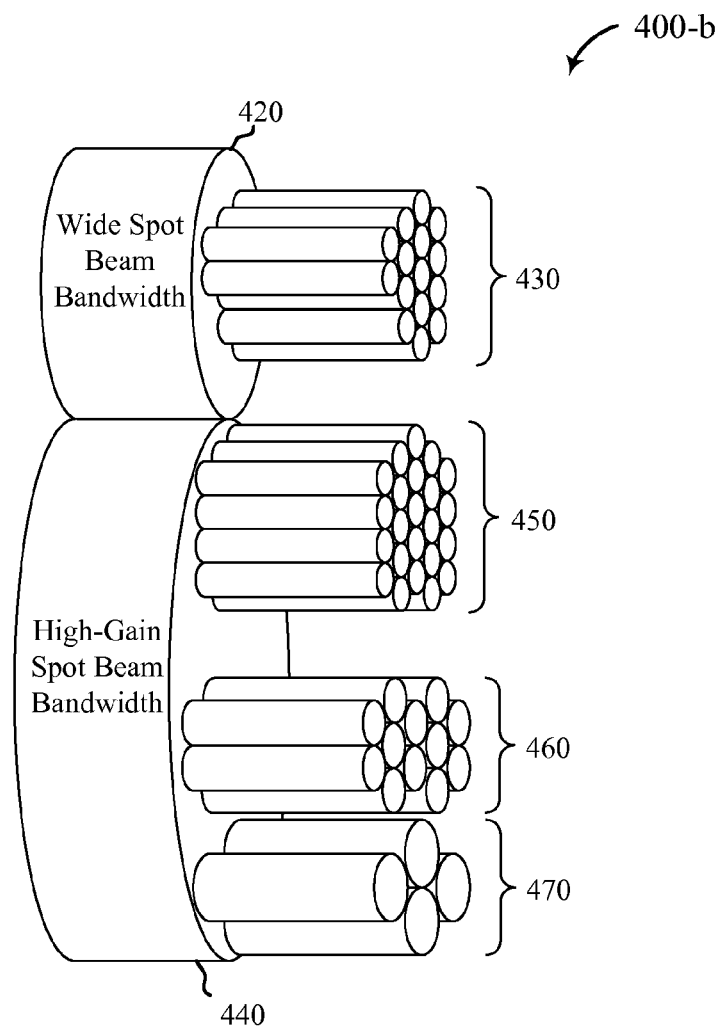
FIG. 4B is a simplified diagram illustrating an example of communication service re-provisioning with the addition of a high-gain spot beam to service an elevated demand region within a wide spot beam according to various embodiments of the principles described herein.

FIG. 4B is a simplified diagram 400-b illustrating an example of communication service re-provisioning with the addition of a high-gain spot beam 210 to service an elevated demand region within the wide spot beam 205. As illustrated in diagram 400-b, high-gain spot beam capacity 440 may be larger than wide spot beam capacity 420 (e.g., because of higher antenna gain, higher modulation order, use of more system bandwidth, etc.). However, FIG. 4B is not drawn to scale and differences between usable capacity/bandwidth for the beams may vary depending on channel conditions, system resources, and other reasons.

Some terminals that received communication service via the wide spot beam 205 of the first satellite may be transitioned to be provided service via the high-gain spot beam 210 of the second satellite. For example, high-gain spot beam capacity 440 may be provisioned into various service levels (e.g., provisioned service levels 450, 460, 470, etc.) and each terminal transitioned to the high-gain spot beam 210 may be serviced by one of the provisioned service levels for high-gain spot beam 210. In embodiments, each of the provisioned service levels 450, 460, and/or 470 may have a higher QoS than the communication service formerly provided by the wide spot beam 205 of the first satellite. New terminals within the coverage area of the high-gain spot beam 210 may also be provided service by the high-gain spot beam 210 according to one of the provisioned service levels 450, 460, and/or 470.

Because some of the terminals that were serviced by the wide spot beam 205 have transitioned to the second communication service provided by the high-gain spot beam 210, the wide spot beam capacity 420 may not be fully utilized by the terminals still serviced by the wide spot beam 205. In embodiments, the communication service provided to terminals that remain serviced by the wide spot beam 205 may be re-provisioned to a higher QoS. For example, diagram 400-b illustrates that terminals that remain serviced by the wide spot beam 205 may be re-provisioned for higher service level as shown in larger provisioned service levels 430. Alternately (not shown), the communication service provided via the wide spot beam 205 may keep the same QoS level or the QoS level may even be lowered. Additionally or alternatively, provisioned service levels 430 may illustrate a new communication service provided by the wide spot beam 205. In this example, some terminals outside the coverage area for high-gain spot beam 210 may be transitioned to the new service with higher QoS levels while some terminals may remain provisioned for the original service levels (not shown).

Figure 5A:
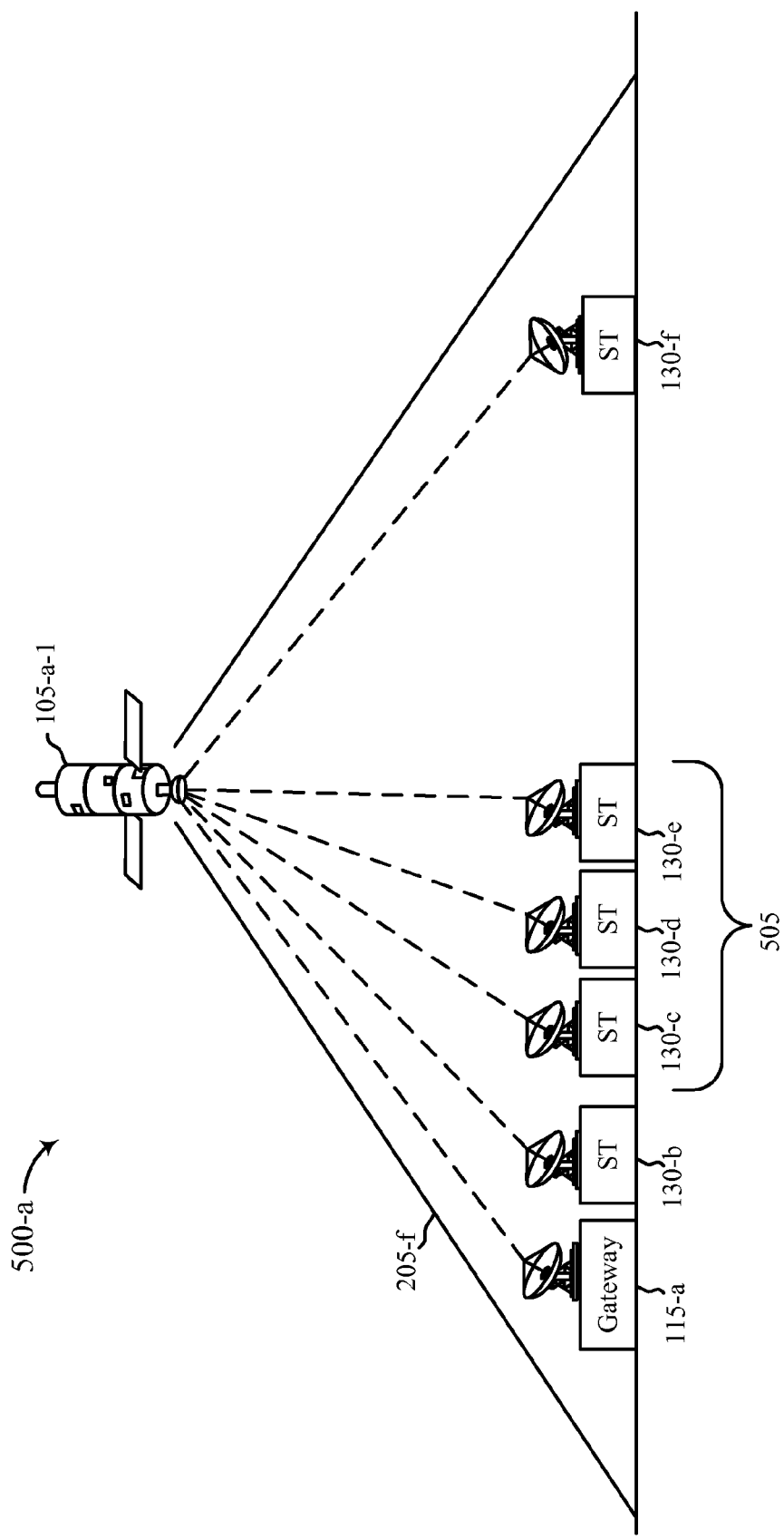
FIGS. 5A-5C are block diagrams of an example satellite communication system at different points in time according to various embodiments of the principles described herein.
Figure 5B:
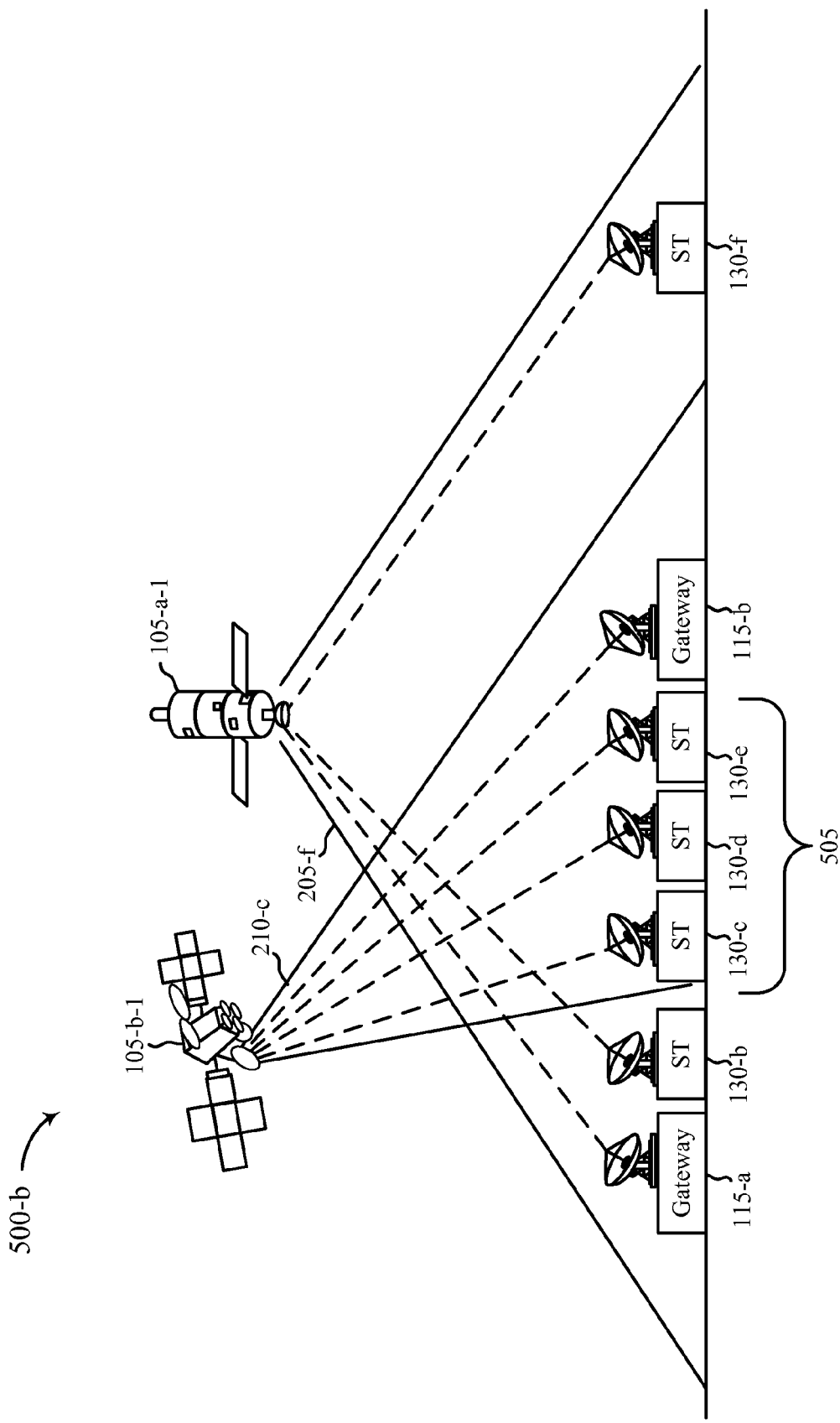
Figure 5C:
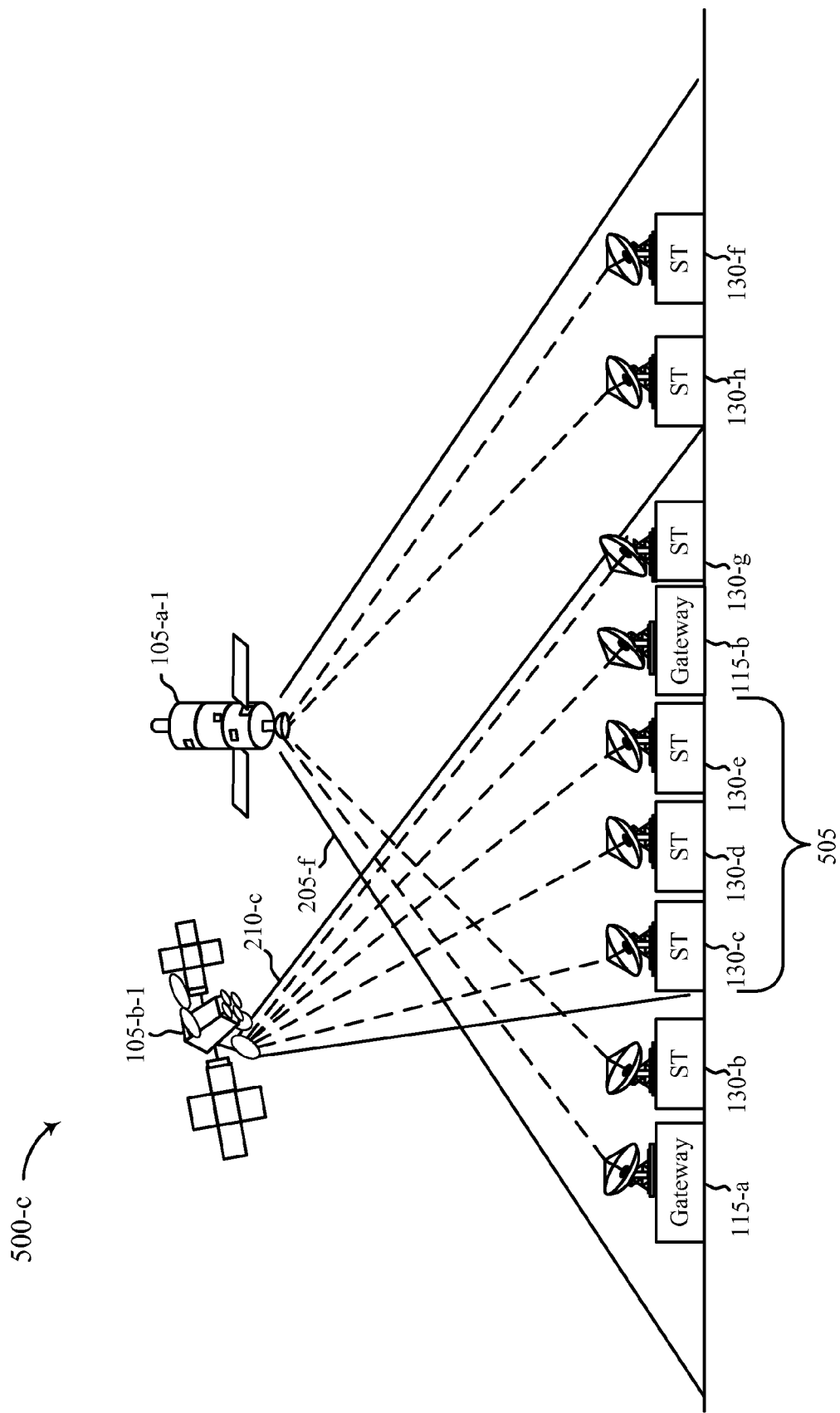

FIGS. 5A-5C illustrate a system 500 for satellite communications at different points in time. At the point in time shown in FIG. 5A, the system 500 includes a first satellite 105-a-1, a gateway system 115-a, and a number of subscriber terminals 130. The first satellite 105-a-1 may be an example of the satellites 105 described above with reference to FIG. 1, FIG. 2, and/or FIG. 3. The gateway system 115 may be an example of the gateway system 115 described above with reference to FIG. 1 and in some embodiments may be outside any user beam. The subscriber terminals 130 may be examples of the subscriber terminals described above with reference to FIG. 1. At the points in time shown in FIGS. 5B and 5C, the system 500 also includes a second satellite 105-b-1. The second satellite 105-b-1 may also be an example of the satellites 105 described above with reference to FIG. 1, FIG. 2, and/or FIG. 3.

Referring now to FIG. 5A, the system is shown at a first point in time by diagram 500-a. The first satellite 105-a-1 transmits and receives data over a wide spot beam 205-f having a first coverage area. The first coverage area includes the gateway system 115-a and each of the subscriber terminals 130. The gateway system 115-a may be communicatively coupled with a network (not shown), and transmit and receive data between the network and each of the subscriber terminals 130 by way of a first communication service implemented using the wide spot beam 205-f of the first satellite 105-a-1. Once a subscriber terminal 130 has subscribed to the first communication service, the subscriber terminal 130 may communicate with the gateway system 115-a over the wide spot beam 205-f of the first satellite 105-a-1.

In certain examples, one or more multiplexing techniques may be employed to implement multiple channels over the wide spot beam 205-f Additionally or alternatively, multiple carrier frequencies may be transmitted between the subscriber terminals 130 and the gateway system 115-a in parallel using the wide spot beam 205-f to allow for multiple channels of data in the communication service associated with the wide spot beam 205-f.

In the example of FIG. 5A, the gateway system 115-a may be physically located within the coverage area of the wide spot beam 205-f of the first satellite 105-a-1. In alternative examples, the gateway system 115-a may be located outside of the coverage area of the wide spot beam 205-f, such as within the coverage area of a different beam (not shown) provided by the first satellite 105-a-1. When in different beams, the gateway system 115-a may reuse the same system resources as the subscriber terminals 130. When in the same beam, the gateway system 115-a and subscriber terminals 130 may be assigned to different system resources. In some embodiments, a substantial fraction of gateways may be deployed away from all beams that service users to enable frequency reuse between gateways and user terminals.

As further shown in FIG. 5A, the coverage area of the wide spot beam 205-a of the first satellite 105-a-1 may include a region 505 having a higher density of subscriber terminals 130 and/or a higher demand for data throughput than other regions of the coverage area of the wide spot beam 205-a. Note that while FIG. 5A shows a reduced number of subscriber terminals 130 for clarity in illustration, there may be thousands or even millions of subscriber terminals 130 within the coverage area of the wide spot beam, and hundreds or thousands of subscriber terminals 130 in the region 505 of high density or high demand. The subscriber terminals 130 in the region 505 of high density or high demand may therefore disproportionately reduce the data throughput of the first satellite 105-*a*-1 available to other regions of the coverage area.

Referring now to FIG. 5B, the system is shown at a second point of time by diagram 500-*b*, at which the second satellite 105-*b*-1 has been deployed to increase the capacity available to the subscriber terminals 130 in the coverage area of the wide spot beam 205-*f*. The second satellite 105-*b*-1 may be deployed by launching a new satellite or deploying an existing satellite to the coverage area.

The second satellite 105-*b*-1 may be configured to provide a second communication service to a subset of the subscriber terminals 130 located within the coverage area of the wide spot beam 205-*f* of the first satellite 105-*a*-1. The second communication service provided by the second satellite 105-*b*-1 may be implemented by a spot beam 210-*c* from the second satellite, the spot beam 210-*c* having a coverage area that includes a portion of the coverage area of the wide spot beam 205-*f* of the first satellite 105-*a*-1. While only one spot beam 210-*c* from the second satellite 105-*b*-1 is shown in FIG. 5B for clarity in illustration, it should be understood that the second satellite 105-*b*-1 may provide multiple spot beams to various different regions, both inside and outside of the coverage area of the wide spot beam 205-*f*.

As shown in FIG. 5B, a second gateway system 115-*b* may be used to connect the second satellite 105-*b*-1 to a network. The second satellite 105-*b*-1 may be in communication with the same or a different gateway system 115-*a* as the first satellite 105-*a*-1. In this way, the second communication service provided through the spot beam 210-*c* of the second satellite 105-*b*-1 may include access to the same network(s) as the first communication service provided through the wide spot beam 205-*f* of the first satellite 105-*a*-1. However, in certain examples, there may also be differences in the resources provided through the different communication services. For instance, both the first communication service and the second communication service may provide access to the Internet and national television broadcasts, but only the second communication service may provide access to a regional television broadcast.

The coverage area of the spot beam 210-*c* shown in FIG. 5B includes the region 505 of high density of subscriber terminals 130 or high demand for data throughput. As shown in FIG. 5B, once the spot beam 210-*c* has been deployed, the subset of subscriber terminals 130 located within the coverage area of the spot beam 210-*c* may be transitioned from the first communication service associated with the wide spot beam 205-*f* of the first satellite 105-*a*-1 to the second communication service associated with the spot beam 210-*c* of the second satellite 105-*b*-1. In this way, subscriber terminals 130 associated with the region 505 of high demand may be transitioned to a spot beam 210-*c* with greater data throughput capacity, thereby freeing up capacity on the wide spot beam 205-*f* for subscriber terminals 130 outside of the coverage area of the spot beam 210-*c*.

The transitioning of the identified subscriber terminals 130 located in the coverage area of the spot beam 210-*c* from the first communication service to the second communication service may occur in a number of ways. In certain examples, the transition may include the deployment of technicians to the identified subscriber terminals 130 to manually reconfigure to reposition or replace antennas, reconfigure or replace modems or other receiver equipment, and/or perform other steps associated with gaining access to the second communication service offered through the spot beam 210-*c* of the second satellite 105-*b*-1. Alternately, the consumer may elect to reposition the antenna using mechanical and/or electrical connections.

Additionally or alternatively, one or more of the terminals in the identified subset may be transitioned to the second communication service by delivering hardware components, reconfiguration instructions, encryption keys, electronic credentials, and/or another type of hardware, software, or file to the subscribers associated with the subscriber terminals 130 such that the subscribers perform the reconfiguration themselves.

In additional or alternative examples, one or more of the identified subscriber terminals 130 in the coverage area of the spot beam 210-*c* may be transitioned to the second communication service by transmitting a control signal to the identified subscriber terminals 130. The control signal may cause the identified subscriber terminals 130 to electronically repoint one or more antennas associated with the identified subscriber terminals 130 to align the antennas with a position of the second satellite 105-*b*-1. The control signal may additionally or alternatively reconfigure software, firmware, settings, and the like associated with equipment of the identified subscriber terminals 130 to enable the identified subscriber terminals 130 to communicate with the second satellite 105-*b*-1 and connect to the second communication service. In certain examples, the control signal may be sent to the identified subscriber terminals from the gateway system 115-*a* over the wide spot beam 205-*f* of the first satellite 105-*a*-1 while the identified subscriber terminals 130 are still connected to the first communication service. Example means for electronically repointing the antenna include mechanically moving an antenna reflector and/or antenna feed, updating the beam pattern of a phased array or partial phased array antenna, and mechanical or electrical selection of a different feed element.

At least a portion of the process of transitioning the identified subscriber terminals 130 may include updating one or more gateways 115, system databases, and/or other system configurations to connect the identified subscriber terminals 130 to the second communication service. For example, the process of transitioning the identified subscriber terminals 130 to the second communication service may include updating a routing table at one or more gateway systems 115.

In certain examples, the process of transitioning the identified subscriber terminals 130 in the coverage area of the spot beam 210-*c* from the first communication service to the second communication service may include communicating with the satellites 105 or the gateway system 115-*a* to perform a handoff or handover function in which communication services provided by the first communication service of the first satellite 105-*a*-1 to a subscriber terminal 130 are handed over in real time to the second communication service of the second satellite 105-*b*-1.

Because the pointing angle from the ground to the first satellite 105-*a*-1 may be different from the pointing angle from the ground to the second satellite 105-*b*-1, the same frequency spectrum used for communications with the first satellite 105-*a*-1 may be reused for beams to/from the second satellite 105-*b*-1. Thus, for example, the second gateway system 115-*b* for the second satellite 105-*b*-1 may be anywhere in relation to the gateway system 115-*a* and wide spot beams for the first satellite 105-*a*-1 and gateways 115-*a* and 115-*b* may still use the same gateway frequency spectrum without causing substantial interference. Moreover, the gateway frequency spectrum for the second satellite 105-*b*-2 may be the same frequency spectrum as used for the first gateway system 115-*a* and/or the subscriber terminals 130 communicating with the first satellite 105-*a*-1. Thus, frequency allocations for the two satellite systems can be done somewhat independently. In certain examples, the frequency spectrum or polarization used by both satellites 105-*a*-1, 105-*b*-1 may be coordinated. For example, the frequency spectrum or polarization used by the subscriber terminals 130 may be coordinated such that the same subscriber terminals 130 may be used to communicate with either of the satellites 105-*a*-1, 105-*b*-1 by repointing the terminal antenna.

FIG. 5C illustrates the system at a third point in time in diagram 500-*c*. As shown in FIG. 5C, new subscriber terminals 130-*g* and 130-*h* have been added. New subscriber terminal 130-*g* is located within the coverage area of the spot beam 210-*c*. Consequently, new subscriber terminal 130-*g* may be added to the second communication service implemented over the spot beam 210-*c* of the second satellite 105-*b*-1 or to the first communication service implemented over the wide spot beam 205-*f* of the first satellite 105-*a*-1. This service selection may be made based on system loading, usage estimates, etc. By contrast, new subscriber terminal 130-*h* is located outside of the coverage area of the high-gain spot beam 210-*c*, and may therefore be added to the first communication service implemented over the wide spot beam 205-*f* of the first satellite 105-*a*-1, but not to the second communication service implemented over the high-gain spot beam 210-*c* of the second satellite 105-*b*-1.

In some examples, the satellite system may employ more than two satellites and may employ high-gain spot beams of different sizes. For example, a third multi-beam satellite may be added to the systems of FIG. 2, FIG. 3, and/or FIGS. 5A-5C and may service high-gain spot beams that overlap the wide spot beams of the first satellite 105-*a* and/or the high-gain spot beams of the second satellite 105-*b*. In embodiments, the orbital slot for the third multi-beam satellite may have sufficient angular separation from the first and second multi-beam satellites to employ frequency re-use of the same system bandwidth as the first and second multi-beam satellites.

In embodiments, a later deployed multi-beam satellite (e.g., second multi-beam satellite and/or third multi-beam satellite above) may use a two-color re-use scheme where each beam uses the entire system bandwidth and adjacent beams or partially overlapping beams use orthogonal polarizations. In one embodiment, a first color uses the entire system bandwidth of a first polarization (e.g., RHCP, etc.) while the second color uses the same system bandwidth of an orthogonal polarization (e.g., LHCP, etc.). The later deployed multi-beam satellite may employ a number of high-gain spot beams using two-color frequency re-use, where each high-gain spot beam overlaps at most one other high-gain spot beam. The two-color frequency re-use may be performed using orthogonal polarizations. One advantage of using the whole system bandwidth for each high-gain spot beam is more flexible application of beam-hopping techniques as described in more detail below.

Figure 6A:
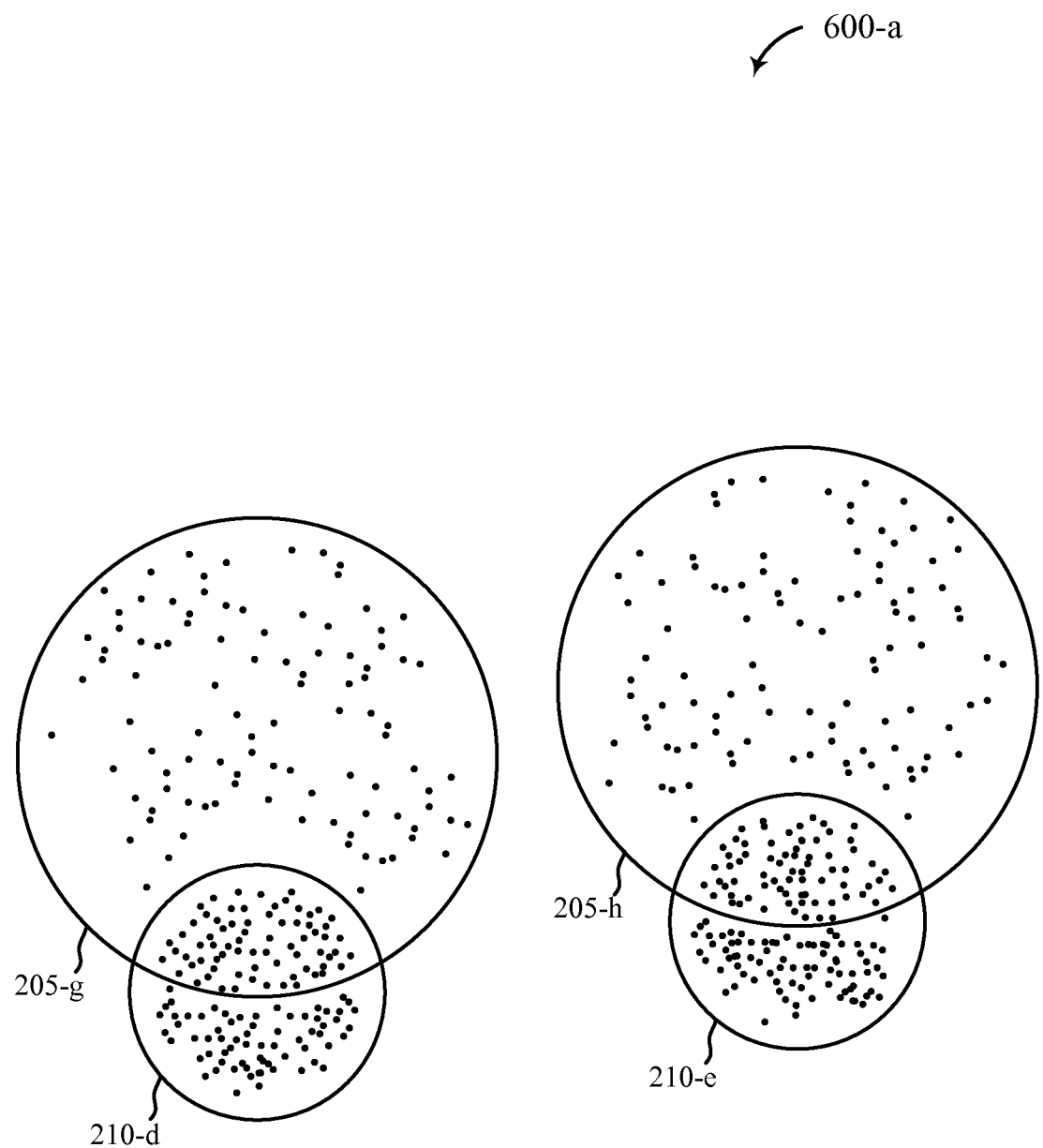
FIGS. 6A-6E are diagrams of example spot beam deployments according to various embodiments of the principles described herein.

FIG. 6A is a simplified diagram 600-*a* showing a top view of coverage areas for example wide spot beams 205-*g* and 205-*h* from the first satellite 105-*a*, an example first high-gain spot beam 210-*d*, and an example second high gain spot beam 210-*e* from a second satellite 105-*b*. FIG. 6A also illustrates the location of example subscriber terminals (illustrated as dots) with respect to the coverage areas of the beams. The wide spot beam 205-*g* may be an example of the wide spot beams 205 described above with reference to FIGS. 2, 3, and/or 5A-5C. The high-gain spot beams 210 may be examples of the high-gain spot beams described above with reference to FIGS. 3 and/or 5A-5C. The subscriber terminals may be examples of the subscriber terminals described above with reference to FIGS. 1-5C. In this example, wide spot beams 205-*g* and 205-*h* may or may not be tiled with other neighboring wide spot beams 205.

The wide spot beams 205 may be used to provide a first communication service from a first satellite 105-*a* and the high-gain spot beams 210 may provide a second communication service from a second satellite 105-*b*. As shown in FIG. 6A, the high-gain spot beams 210 may be directed to regions of higher subscriber terminal density or elevated demand within the coverage area of the wide spot beams 205. Additionally or alternatively, the high-gain spot beams 210 may be directed to regions of predicted higher subscriber terminal density within the coverage area of wide spot beams 205. For example, high-gain spot beams 210 may be directed to regions of higher population density instead of regions of higher existing demand for satellite communication services. In certain examples, each of the subscriber terminals may at first subscribe to the first communication service from the wide spot beams 205 of the first satellite.

As the demand for communication data throughput within the coverage region of wide spot beams 205 increases, the high-gain spot beams 210 may be deployed to the regions of higher subscriber terminal density or potential demand, and subscriber terminals may be transitioned to the second communication service as appropriate. Thus, a subset of the subscriber terminals located within the coverage region for the first high-gain spot beam 210-*d* may be transitioned to the second communication service associated with the first high-gain spot beam 210-*d*. Similarly, a subset of the subscriber terminals located within the second high-gain spot beam 210-*e* may be transitioned to the second communication service associated with the second high-gain spot beam 210-*e*. Subscriber terminals outside of the coverage area of either high-gain spot beam 210 may remain subscribed to the first communication service associated with the wide spot beams 205.

Figure 7A:
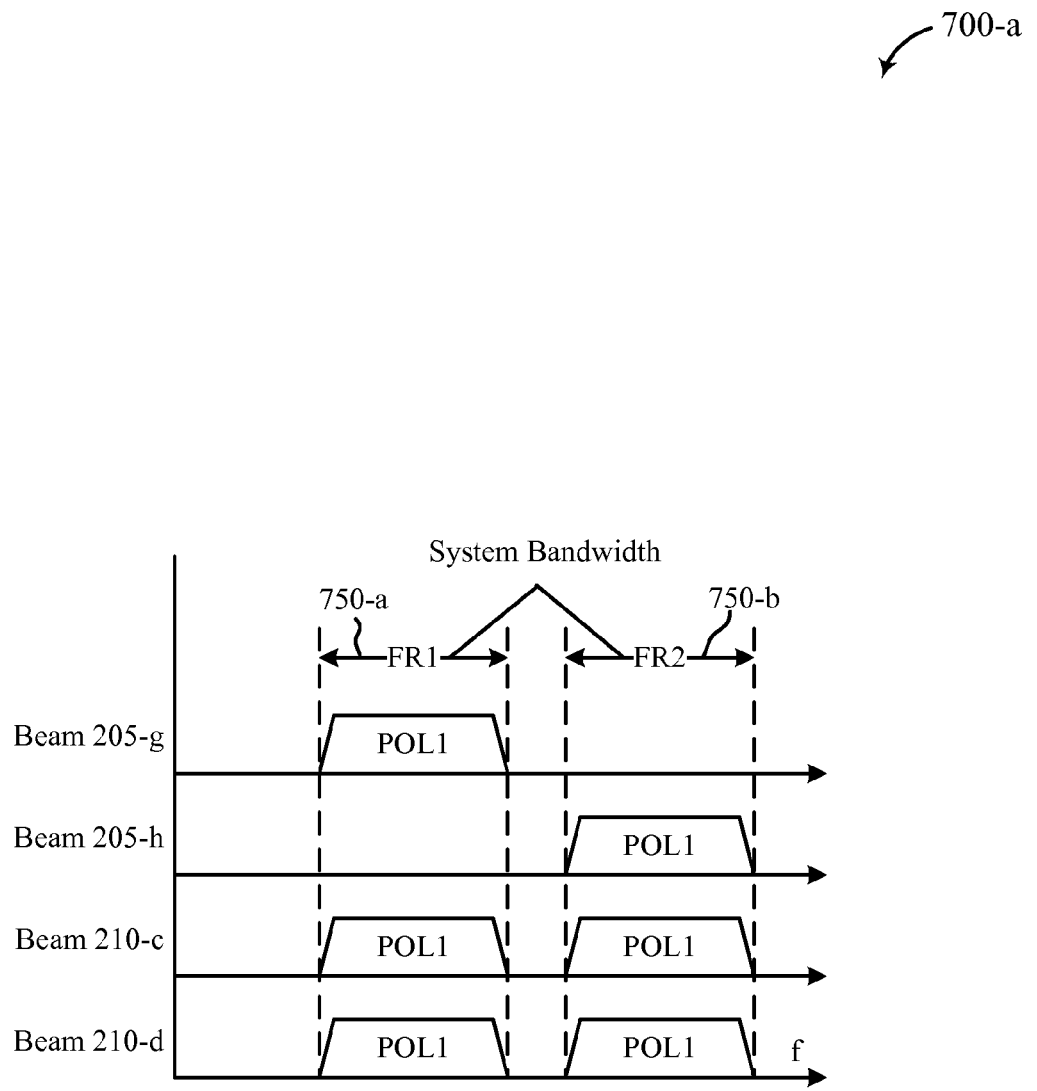
FIGS. 7A-7E are diagrams of example frequency re-use within spot beam deployments according to various embodiments of the principles described herein.

As described above, the high-gain spot beams 210 may reuse frequency spectrum used by the wide spot beams 205-*g* and 205-*h*. FIG. 7A illustrates a diagram 700-*a* of an example frequency re-use scheme for spot beams 205-*g*, 205-*h*, 210-*d*, and 210-*e*. For example, the system resources may be divided into four colors, with each color assigned one of frequency blocks FR1 750-*a* or FR2 750-*b* and one of two polarizations POL1 or POL2 (e.g., horizontal, vertical, LHCP, RHCP, etc.). Frequency blocks FR1 750-*a* and FR2 750-*b* may be adjacent (e.g., with a contiguous system bandwidth 750), or, as illustrated in diagram 700-*a*, non-adjacent portions of the frequency spectrum. In diagram 700-*a*, wide spot beam 205-*g* is assigned to a first color (FR1, POL1) and wide spot beam 205-*h* is assigned to a second color (FR2, POL1). As illustrated in diagram 700-*a*, high-gain spot beam 210-*d* may be allocated to use system resources that overlap with wide spot beam 205-*g* and high-gain spot beam 210-*e* may be allocated to use system resources that overlap with wide spot beam 205-*h* because of the angular separation between the satellites 105-*a* and 105-*b*. Further, high-gain spot beams 210-*d* and 210-3 may re-use system resources because of the angular separation between the beams. In one example, high-gain spot beams 210-*c* and 210-*d* use up to the entire system bandwidth 750 and the same polarization as either of high-gain spot beams 210-*g* or 210-*h* as illustrated in FIG. 7A.

In embodiments, each high-gain spot beam 210 may have a higher capacity than each wide spot beam 205. For example, while wide spot beam 205-*g* may use only a portion of the system bandwidth 750, each high-gain spot beam 210 may use up to the entire system bandwidth. In addition, high-gain spot beams 210 have higher antenna gain than wide spot beams 205. The higher antenna gain may allow the use of, for example, a higher order modulation, thereby providing more data capacity in each channel of the system bandwidth.

In embodiments, the higher capacity of high-gain spot beams 210 may open up new markets for satellite service. For example, certain areas such as high population density urban areas may be well-served by wired Internet infrastructure (e.g., cable, fiber optic, etc.) and traditional satellite Internet services may have difficulty competing with the existing wired infrastructure in these areas. However, high-gain spot beams 210 may provide superior data rates and/or capacities and may make satellite Internet service within these regions competitive or more cost effective (e.g., per Mbps) than wired Internet services.

In certain examples, additional measures may be taken with respect to each subscriber terminal located near a fringe area (i.e. outer edge or "low beam" area) of a high-gain spot beam 210 to determine whether to transition that subscriber terminal to the communication service associated with the high-gain spot beam 210 or allow the subscriber terminal to remain a subscriber of the communication service associated with the wide spot beam 205.

In some examples, each subscriber terminal located within a threshold distance of the outer edge of a high-gain spot beam 210 may be transitioned to the communication service of that high-gain spot beam 210 only if the signal quality of the high-gain spot beam 210 at the location of the subscriber terminal is greater than the signal quality (e.g. the absolute signal level, relative signal level, signal to noise ratio, signal to interference ratio, or the like) of the wide spot beam 205. Additionally or alternatively, each subscriber terminal located within a threshold distance of the outer edge of a high-gain spot beam 210 may be transitioned to the communication service of that high-gain spot beam 210 based on a comparison of the available capacity of the satellite providing the wide spot beam 205 to the available capacity of the satellite providing the high-gain spot beam 210. In additional or alternative examples, default rules may exist that dictate whether a subscriber terminal transitions to the communication service of a high-gain spot beam 210 based on a distance of the subscriber terminal from a center of the high-gain spot beam 210.

The determination of whether to transition a subscriber terminal located near a fringe area of a high-gain spot beam 210 to the communication service associated with that high-gain spot beam 210 may be made, in certain examples by a machine, such as a gateway device or other satellite management device. In such examples, the management device making the determination may receive a location of each subscriber terminal (e.g., in a communication from the subscriber terminal, from a lookup table, or some other means) and determine the appropriate communication service for that subscriber terminal.

Once the determination of whether to transition a subscriber terminal to a high-gain spot beam 210 is made, transitioning the terminal may include repointing an antenna of the terminal for service by the high-gain spot beam. Terminals may be repointed using an automatic or semi-automatic process using some level of user involvement or technician support, as described in more detail below.

Figure 6B:
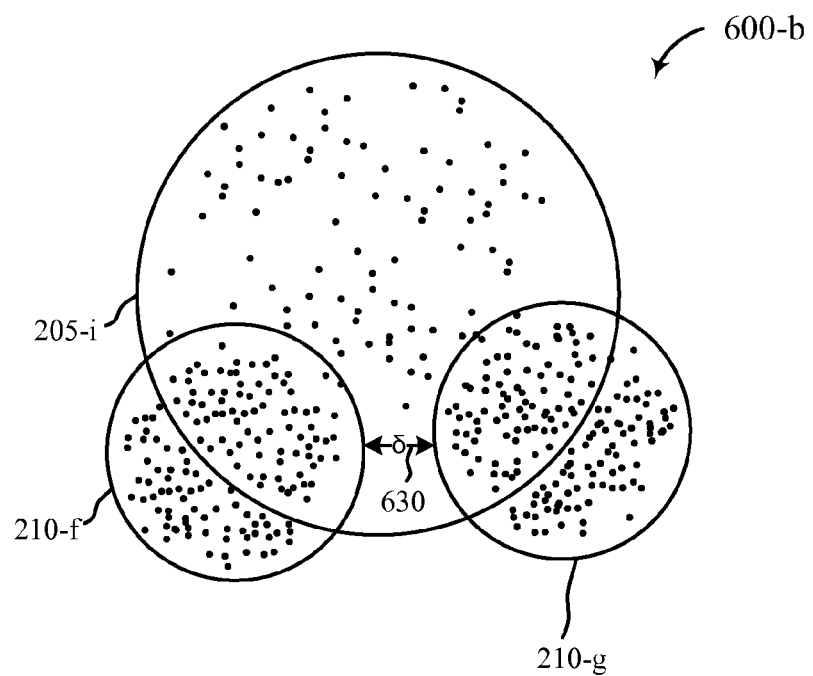

In some embodiments, multiple high-gain spot beams 210 may be deployed within or partially overlapping with the coverage region for a single wide spot beam 205. FIG. 6B is a simplified diagram 600-b showing a top view of coverage areas for example wide spot beam 205-i from the first satellite 105-a, and example first and second high-gain spot beams 210-f and 210-g from a second satellite 105-b. FIG. 6B also illustrates the location of example subscriber terminals (illustrated as dots) with respect to the coverage areas of the beams. The wide spot beam 205-i may be an example of the wide spot beams 205 described above with reference to FIGS. 2, 3, and/or 5A-5C. The high-gain spot beams 210 may be examples of the high-gain spot beams described above with reference to FIGS. 3 and/or 5A-5C. The subscriber terminals may be examples of the subscriber terminals described above with reference to FIGS. 1-5C. In this example, wide spot beam 205-i may or may not be tiled with other neighboring wide spot beams 205.

In the example illustrated in diagram 600-b, high-gain spot beam 210-f may be deployed to provide the second communication service to a first elevated demand region and high-gain spot beam 210-g may be deployed to provide the second communication service to a second elevated demand region. The first and second elevated demand regions may partially or fully overlap with the coverage region for the wide spot beam 205-i. In this example, high-gain spot beams 210-f and 210-g may be spatially separated by a distance δ 630, allowing high-gain spot beams 210-f and 210-g to use the same system resources (e.g., the same frequency and polarization). Distance δ 630 may be minimum distance for frequency re-use and may be based on a minimum angular separation between beams using the same system resources.

Figure 7B:
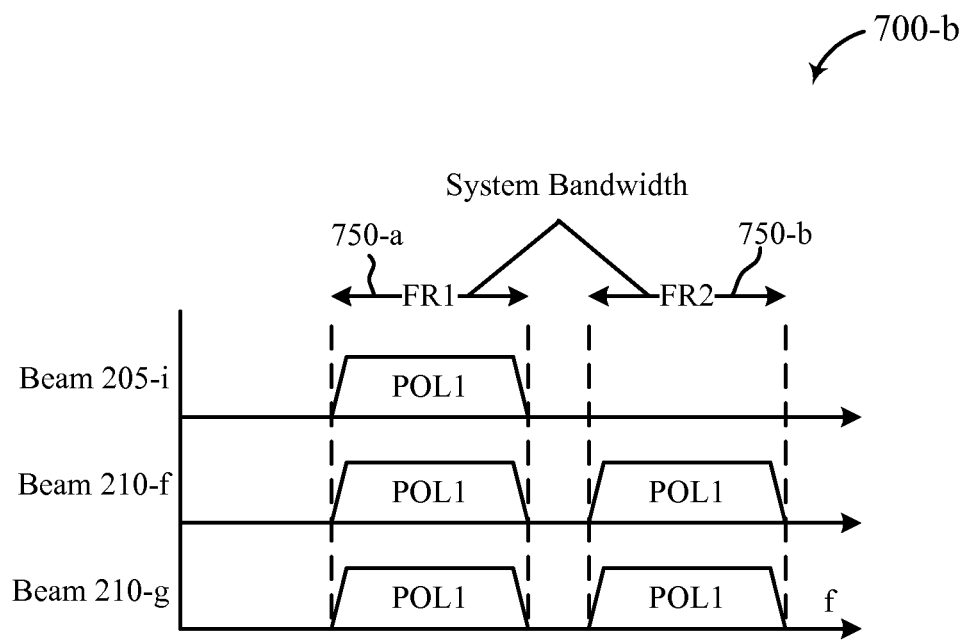

FIG. 7B illustrates a diagram 700-b of an example frequency re-use scheme for spot beams 205-i, 210-f, and 210-g of FIG. 6B. As illustrated in diagram 700-b, system resources may be allocated to wide spot beam 205-i based on a four-color frequency re-use scheme where wide spot beam 205-i is allocated to use a portion of the system bandwidth and a polarization (e.g., FR1, POL1). High-gain spot beams 210-f and 210-g may be allocated to use system resources that overlap with wide spot beam 205-i because of the angular separation between the satellites 105-a and 105-b. High-gain spot beams 210 of the second satellite 105-b may be allocated system resources based on a two-color frequency re-use scheme where each beam is allocated up to the entire system bandwidth and one of two orthogonal polarizations. In diagram 700-b, high-gain spot beam 210-f is allocated to use the entire system bandwidth 750 and a first polarization and high-gain spot beam 210-g is allocated to use the entire system bandwidth 750 and also the first polarization.

Figure 6C:
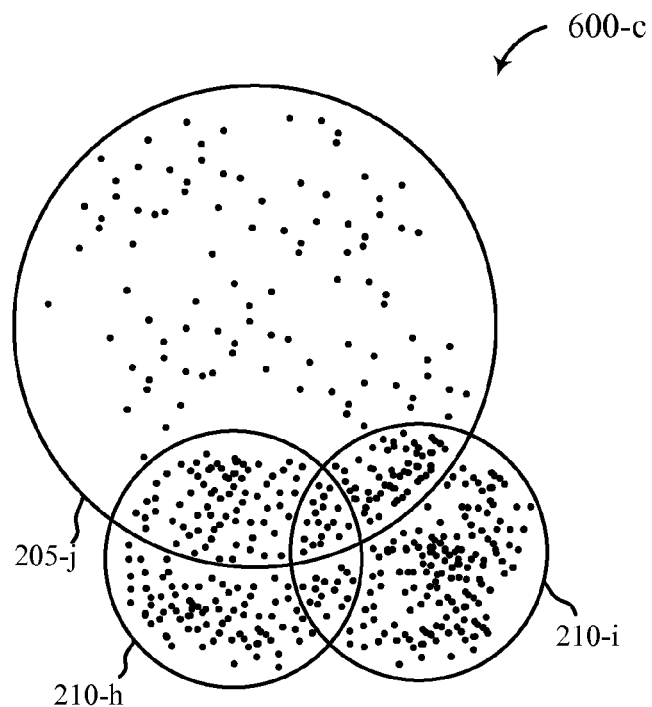

In some examples, high-gain spot beams 210 may deployed to provide service with overlapping coverage regions. FIG. 6C is a simplified diagram 600-c showing a top view of coverage areas for example wide spot beam 205-j from the first satellite 105-a, and example coverage regions for first and second high-gain spot beams 210-h and 210-i from a second satellite 105-b that partially overlap. FIG. 6C also illustrates the location of example subscriber terminals (illustrated as dots) with respect to the coverage areas of the beams. The wide spot beam 205-j may be an example of the wide spot beams 205 described above with reference to FIGS. 2, 3, and/or 5A-5C. The high-gain spot beams 210 may be examples of the high-gain spot beams described above with reference to FIGS. 3 and/or 5A-5C. The subscriber terminals may be examples of the subscriber terminals described above with reference to FIGS. 1-5C. In this example, wide spot beam 205-j may or may not be tiled with other neighboring wide spot beams 205.

Figure 7C:
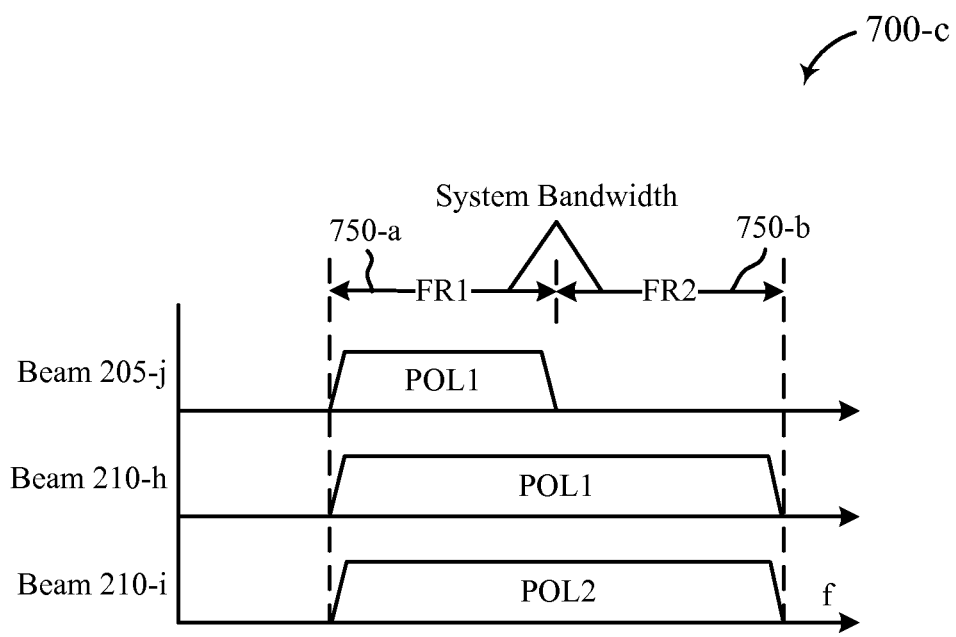

FIG. 7C illustrates a diagram 700-c of an example frequency re-use scheme for high-gain spot beams 205-j, 210-h, and 210-i of FIG. 6C. Similarly to diagram 700-b, high-gain spot beams 210-h and 210-i may re-use system resources allocated to wide spot beam 205-j and may be allocated overlapping frequency ranges up to the entire system bandwidth of orthogonal polarizations.

In some embodiments, the coverage areas for high-gain spot beams 210-*h* and 210-*i* illustrated in FIG. 6C may be completely or almost completely overlapping. For example, high-gain spot beams 210-*h* and 210-*i* may be directed to provide service to the same region. Terminals within the region may be allocated to one or the other of the high-gain spot beams 210-*h* or 210-*i* based on unused capacity of the beams or other factors. In some embodiments, terminals may be able to switch polarizations electronically or mechanically and service for particular terminals may be switched between the beams as demand fluctuates by switching the active polarization of the terminals.

In embodiments, a later deployed multi-beam satellite may use a time sharing or switching scheme where one receive beam (e.g., service beam, feeder beam) at the satellite can be connected to one transmit beam (e.g., service beam, feeder beam). Switches on the satellite may connect the beam signal pathways in a flexible allocation for each slot within a frame, providing flexible coverage area and flexible forward/return link capacity. For example, forward link capacity from a gateway may be flexibly allocated to spot beams by switching a full-spectrum feeder beam received at the satellite from the gateway to a service beam. The full-spectrum feeder beam may be switched between service beams dynamically on a slot-by-slot basis. Thus, at any instant of time, interbeam interference may be managed by placing active beams as far apart as practical. The coverage areas for these transient beams may safely overlap or abut each other in this example.

Figure 6D:
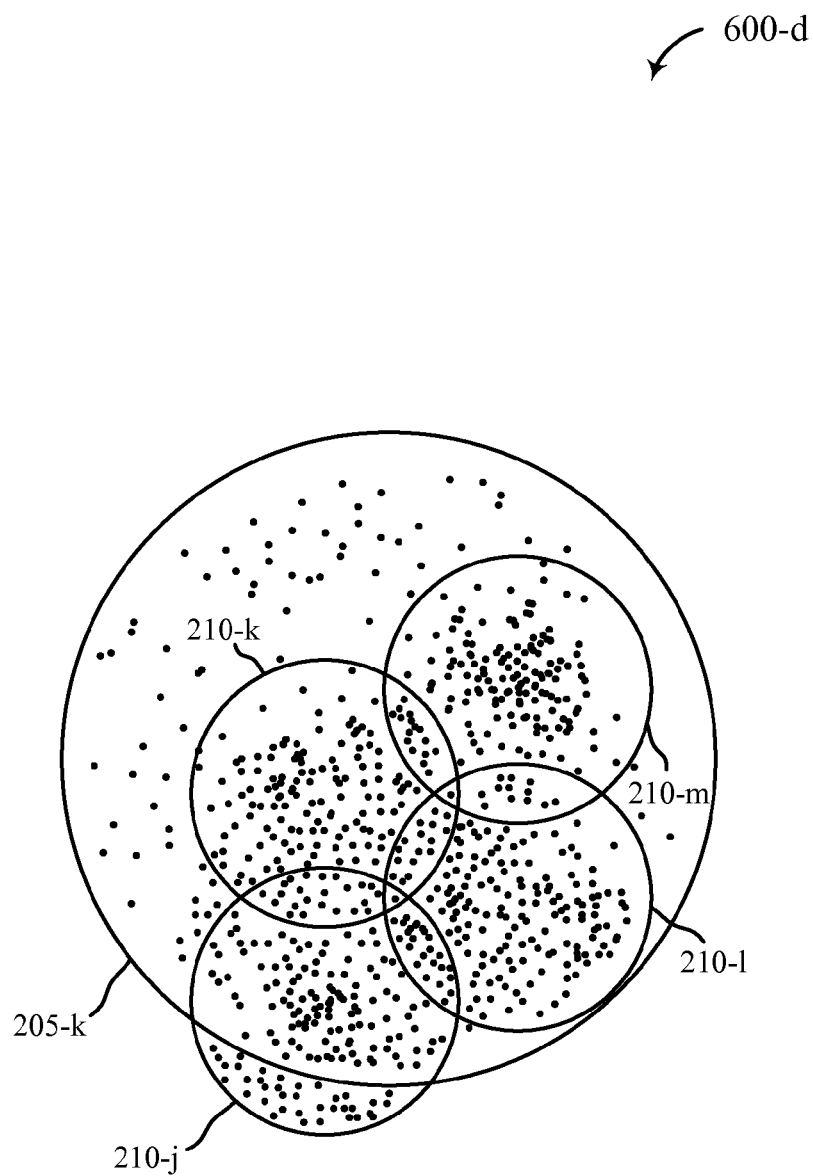

In some embodiments, time sharing may be used in combination with high-gain spot beam clustering to improve QoS of the communication service to high demand areas. FIG. 6D is a simplified diagram 600-*d* showing a top view of coverage areas for example wide spot beam 205-*k* from the first satellite 105-*a*, and example first, second, and third high-gain spot beams 210-*j*, 210-*k*, 210-*l*, 210-*m* from a second satellite 105-*b* that form a spot beam cluster. FIG. 6D also illustrates the location of example subscriber terminals (illustrated as dots) with respect to the coverage areas of the beams. The wide spot beam 205-*k* may be an example of the wide spot beams 205 described above with reference to FIGS. 2, 3, and/or 5A-5C. The high-gain spot beams 210 may be examples of the high-gain spot beams described above with reference to FIGS. 3 and/or 5A-5C. The subscriber terminals may be examples of the subscriber terminals described above with reference to FIGS. 1-5C. In this example, wide spot beam 205-*k* may or may not be tiled with other neighboring wide spot beams 205.

Figure 7D:
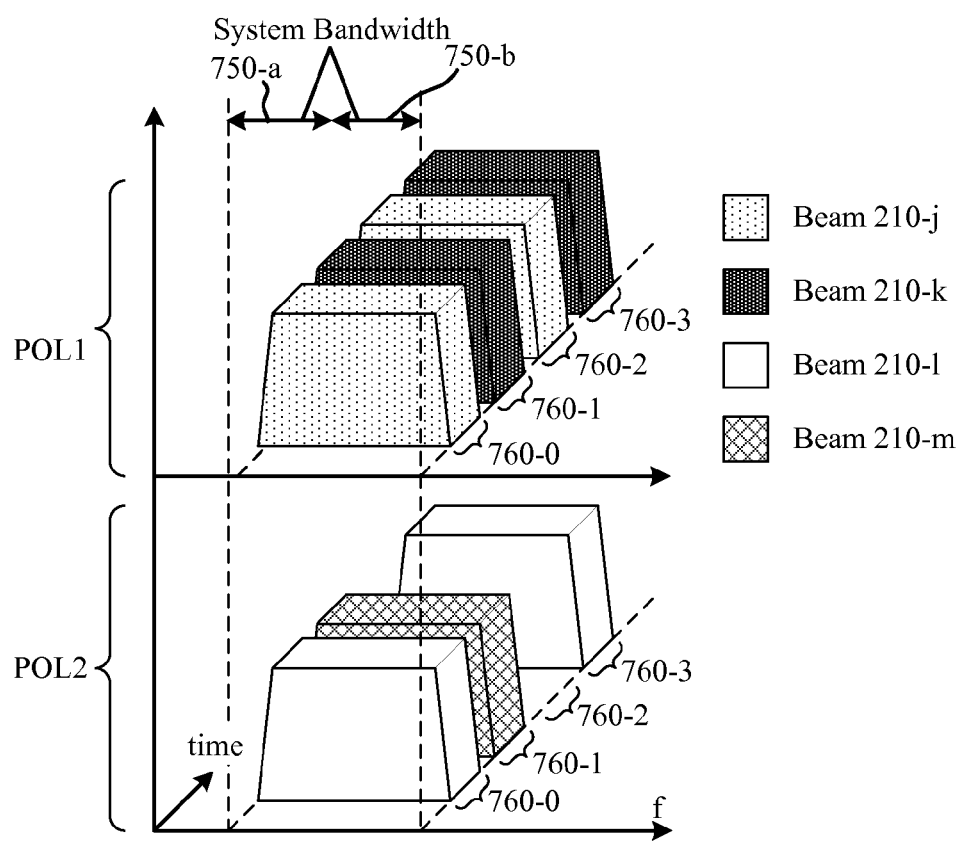

As illustrated in FIG. 6D, high-gain spot beams 210-*j*, 210-*k*, 210-*l*, 210-*m* may each overlap with one or more other high-gain spot beams 210 as part of a high-gain spot beam cluster to service regions of elevated demand. The second satellite 105-*b* may use beam-hopping techniques to manage interbeam interference between high-gain spot beams 210-*j*, 210-*k*, 210-*l*, and 210-*m*. FIG. 7D illustrates an example timing diagram 700-*d* of time sharing techniques for managing interbeam interference of high-gain spot beams 210-*j*, 210-*k*, 210-*l*, and 210-*m* of FIG. 6D. Timing diagram 700-*d* may illustrate, for example, downlink communications for high-gain spot beams 210-*j*, 210-*k*, 210-*l*, and 210-*m* switched at satellite 105-*b* using time sharing.

On the downlink, a feeder beam that is a substantially full system bandwidth beam may be received at the satellite from a gateway and may be switched to an active service beam on a slot-by-slot basis. Timing diagram 700-*d* may illustrate switching for downlink feeder beams to provide downlink communications for active high-gain spot beams 210 during each slot 760. In timing diagram 700-*d*, a downlink feeder beam having a first polarization (POL1) may be switched such that high-gain spot beam 210-*j* is active during slot 760-0 and slot 760-2 and high-gain spot beam 210-*j* is active during slot 760-1 and slot 760-3. A substantially full system bandwidth downlink feeder beam having a second polarization (POL2) may be switched to such that high-gain spot beam 210-*l* is active during slot 760-0 and slot 760-3 and high gain spot beam 210-*m* is active during slot 760-1. The downlink feeder beams may be switched such that other high-gain spot beams are active during other slots 760. As can be seen from timing diagram 700-*d*, the system resources used by high-gain spot beams 210-*j*, 210-*k*, 210-*l*, and 210-*m* are orthogonal from each other either in time or polarization and system resources may be flexibly allocated between high-gain spot beams 210. Uplink communications may be provided for terminals in the coverage areas of high-gain spot beams 210-*j*, 210-*k*, 210-*l* and/or 210-*m* in a similar manner. While FIG. 7D illustrates a beam cluster of four high-gain spot beams 210, time sharing of substantially full system bandwidth feeder beams to high-gain spot beams 210 may be used to provide service using an arbitrary number of high-gain spot beams 210 where time sharing maintains angular separation of concurrently active beams with the same polarization.

Figure 6E:
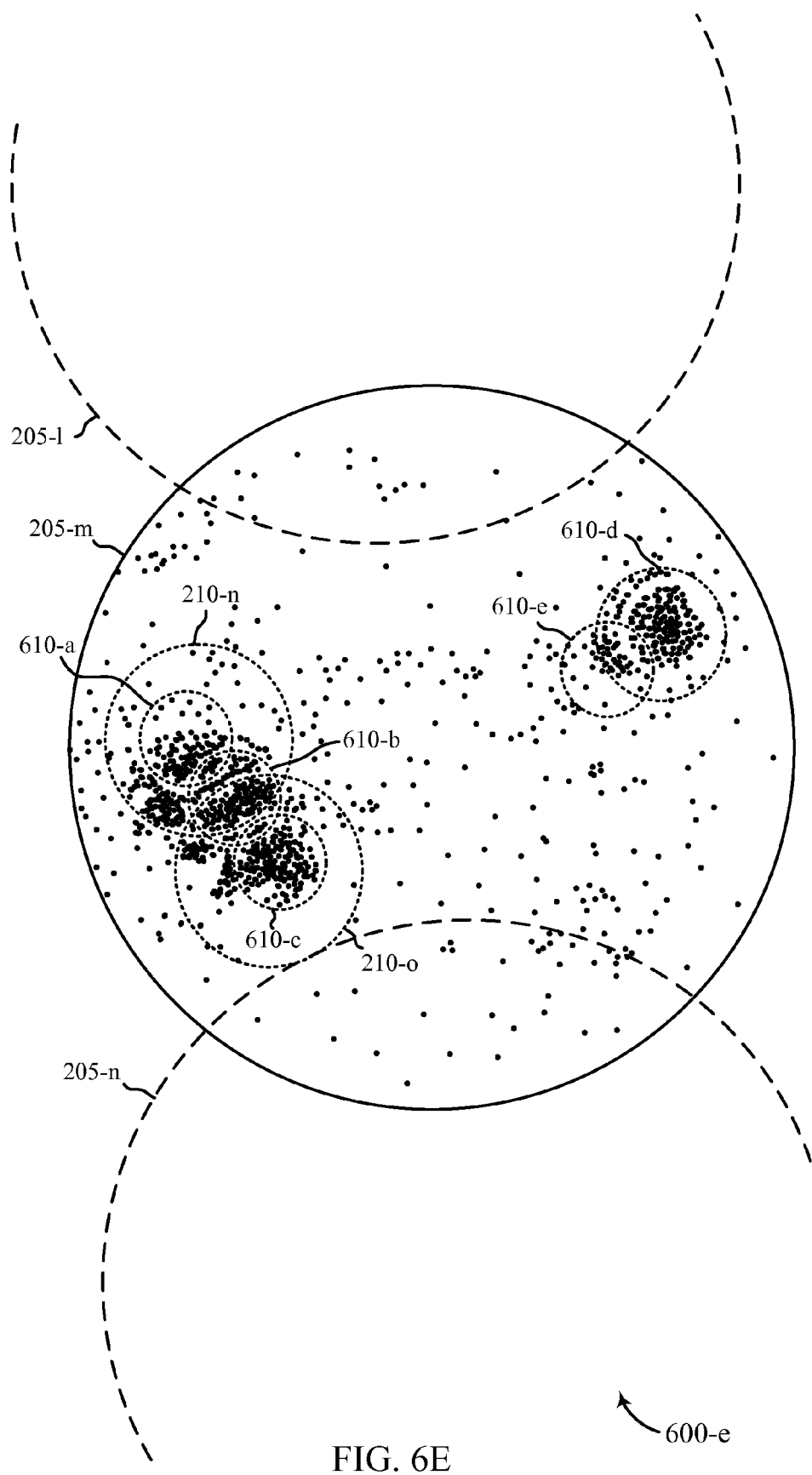

As described above, a fleet of satellites may be deployed to provide multi-level spot-beam service to a service area. The multi-level spot beam service may include wide spot beams and one or more levels of high-gain spot beams. FIG. 6E is a simplified diagram 600-*e* showing a top view of coverage areas for example wide spot beams 205-*l*, 205-*m*, 205-*n*, example first-level high-gain spot beams 210, and example second-level high-gain spot beams 610. FIG. 6E also illustrates the location of example subscriber terminals (illustrated as dots) with respect to the coverage areas of the beams. The wide spot beam 205-*m* may be an example of the wide spot beams 205 described above with reference to FIGS. 2, 3, and/or 5A-5C. The high-gain spot beams 210, 610 may be examples of the spot beams described above with reference to FIGS. 3 and/or 5A-5C. The subscriber terminals may be examples of the subscriber terminals described above with reference to FIGS. 1, 2, 3, and/or 5A-5C.

In the example of FIG. 6E, the first-level high-gain spot beams 210 are deployed within the coverage area of the wide spot beam 205-*m* (e.g., via a second multi-beam satellite) and may be directed to one or more elevated demand regions (not pictured). After this deployment, communication services for subscriber terminals within a coverage area of one of the first-level spot beams 210 may be transitioned from the wide spot beam 205-*m* to the respective first-level high-gain spot beams 210. However, as the demand for satellite communication services continues to grow, the second-level high-gain spot beams 610 may be deployed (e.g., via a third multi-beam satellite) within the coverage area of the wide spot beam 205-*m*. The second-level high-gain spot beams 610 may be smaller than the first-level high-gain spot beams 210. Thus, one or more second-level high-gain spot beams 610 may be deployed within or overlap the coverage area of a given first-level high-gain spot beam 210.

In the present example, the principles described above may be extended to the second-level high-gain spot beams 610 such that communication services for existing subscriber terminals located within the coverage area of a newly deployed second-level high-gain spot beam 610 may be transitioned to that newly deployed second-level high-gain spot beam 610. This transition may free up capacity and resources in the first-level high-gain spot beams 210 and/or the wide spot beam 205-m, thereby providing the first-level spot beams 210 and/or the wide spot beam 205-m increased capacity to add new subscriber terminals.

Communication services for new subscriber terminals may be implemented using the most localized beam available. Thus, communication services for a newly added subscriber terminal outside of the coverage area of a first- or second-level high-gain spot beam 210, 610 may be implemented using the wide spot beam 205-m. Communication services for a new subscriber terminal within the coverage area of a first-level high-gain spot beam 210 but outside the coverage area of a second-level high-gain spot beam 610 may be implemented at the first-level high-gain spot beam 210. Additionally, communication services for a new subscriber terminal within the coverage area of a second-level high-gain spot beam 610 may be implemented at the second-level high-gain spot beam 610.

Figure 7E:
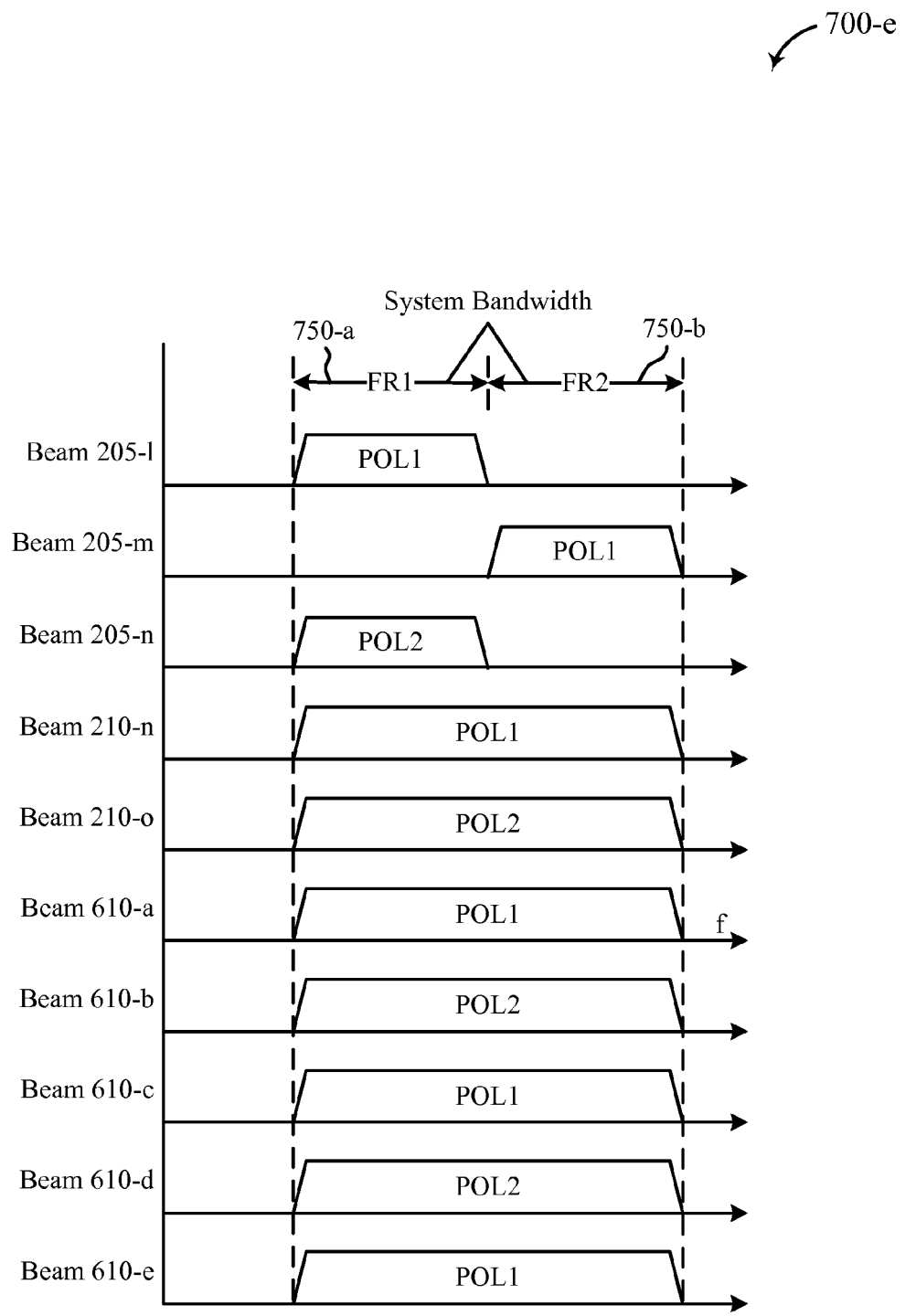

FIG. 7E is a diagram 700-e illustrating example frequency re-use for wide spot beam 205-m and high-gain spot beams 210, 610 illustrated in FIG. 6E. For example, wide spot beam 205-m may be part of a four-color, tiled spot beam pattern similar to the pattern described with reference to FIG. 7A. In diagram 700-e, wide spot beam 205-l is assigned to a first color (FR1, POL1), wide spot beam 205-m is assigned to a second color (FR2, POL1), and wide spot beam 205-n is assigned to a third frequency (FR1, POL2). High-gain spot beam 210-n may be allocated to use all of the system bandwidth 750 using POL1 without interfering with wide spot beam 205-m because of the angular separation between the first and second satellites. High-gain spot beam 210-o may partially overlap high-gain spot beam 210-m and may be allocated to use all of the system bandwidth using POL2.

As discussed above, second-level high-gain spot beams 610 may be provided via a third satellite with sufficient angular separation from the first satellite serving wide spot beam 205-m and the second satellite serving high-gain spot beams 210. As illustrated in FIG. 7E, the second-level high-gain spot beams 610 may reuse the same system bandwidth as the first-level high-gain spot beams 210 and the wide spot beam 205-m. In embodiments, second-level high-gain spot beams 610 may use a two-color re-use scheme where each beam uses the entire system bandwidth and partially overlapping beams use orthogonal polarizations. As illustrated in FIGS. 6E and 7E, each second-level high-gain spot beam 610 may be deployed to partially overlap at most one other second-level high-gain spot beam 610 and partially overlapping beams may be different colors. In one embodiment, the third satellite may use the two-color frequency re-use scheme illustrated in FIGS. 6E and 7E for substantially all beams of the satellite. Additionally or alternatively, the second-level high-gain spot beams 610 may use the time sharing techniques described above with reference to FIGS. 6D and 7D to manage inter-beam interference where more than two second-level high-gain spot beams 610 overlap with each other.

In some embodiments, the amount of overlap of high-gain spot beams 210, 610 may be varied to improve system capacity within a given region even more. For example, high-gain spot beams 610-d and 610-e may overlap partially as illustrated in FIG. 6E, or, in embodiments, they may be totally or almost totally overlapping. Terminals within a coverage region supported by two orthogonal polarization high-gain spot beams may be serviced by either beam depending on the polarization of the terminal. In embodiments, terminals may be assigned to one or the other of overlapping beams based on the available capacity of each beam. In embodiments, assignment of terminals to beams may be changed dynamic or semi-dynamically by terminals designed to switch polarization by electronic or mechanical means (e.g., switchable polarization filter, dual antenna feed, etc.).

While the example of FIG. 6E illustrates deployment of first- and second-level high-gain spot beams 210, 610 within a wide spot beam 205-m, it should be understood that the principles of the present disclosure may be extended to additional levels of nested spot beams as may suit a particular embodiment.

Figure 8:
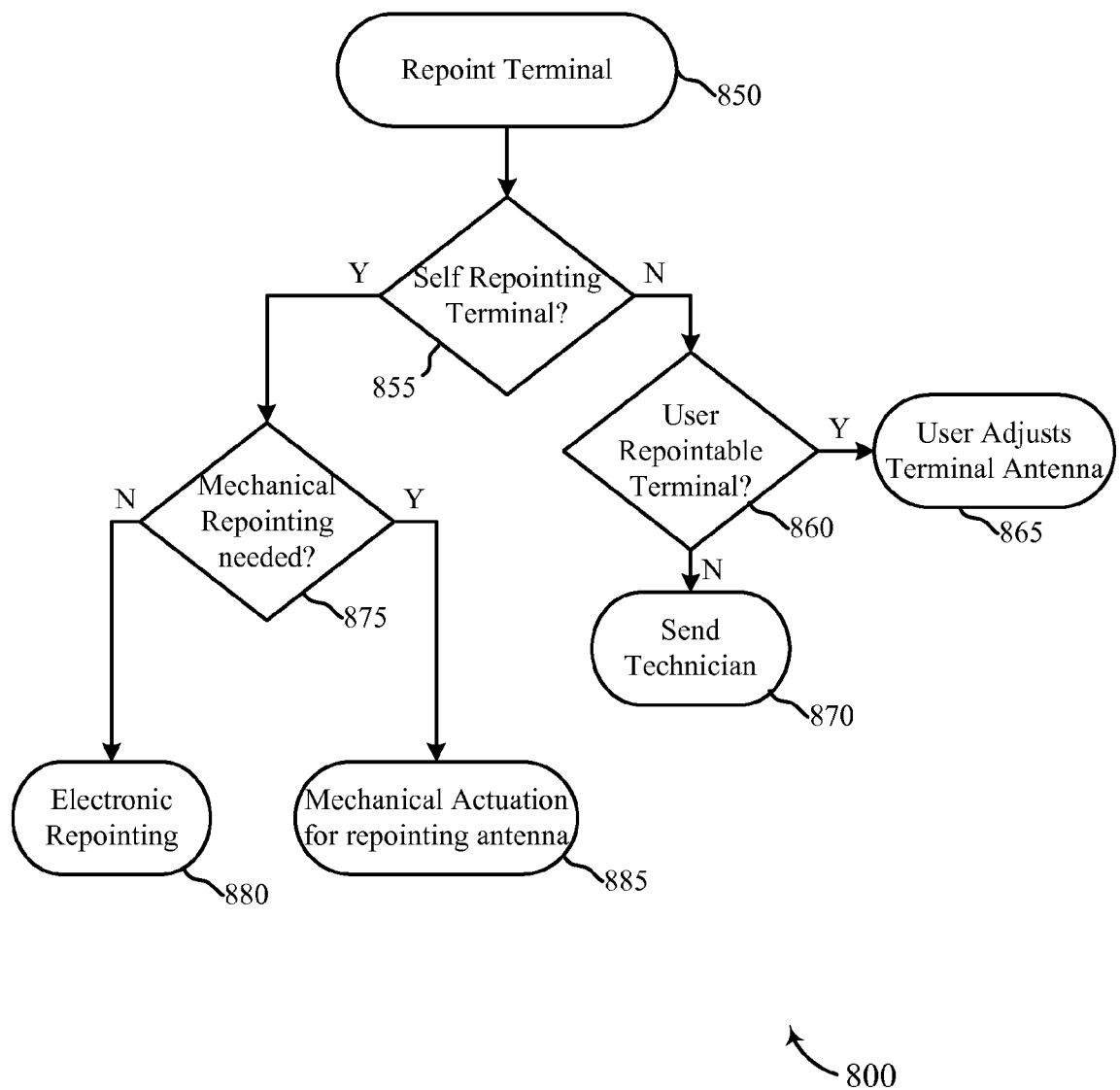
FIG. 8 is a flow chart of an example method for managing satellite communications according to various embodiments of the principles described herein.

As described above, transitioning subscriber terminals from service provided by a wide spot beam 205 to service provided by a high-gain spot beam 210, 610 may include repositioning or repointing the terminal antenna to receive signals from the new satellite. FIG. 8 illustrates a method 800 for repointing a terminal antenna that may be used in service transitioning in accordance with various embodiments. The method 800 may be used, for example, to transition terminals from a communication service provided via a wide spot beam 205 to a communication service provided via a high-gain spot beam as shown in FIGS. 5A-5C, 6A-6E, and/or 7A-7E.

Method 800 begins at block 850 where the determination is made to repoint the terminal for communication service transitioning. At block 855, a determination is made if the terminal is capable of automatically repointing. For example, where a subscriber terminal is capable of automatically performing one or more steps associated with transitioning to a communication service offered by a high-gain spot beam, the management device may transmit a control signal to the subscriber terminal instructing the subscriber terminal to transition to the communication service of the high-gain spot beam. If the terminal is capable of automatically repointing, a determination is made at block 875 of whether mechanical repointing is needed. If mechanical repointing is not needed, the method may end at block 880 where the service for the terminal is switched electronically (e.g., by switching feed selection, beam weight adjustment, etc.). If mechanical repointing is needed, the control signal may instruct the subscriber terminal to actuate an antenna associated with the subscriber terminal to align the antenna for service via the high-gain spot beam at block 885.

Where the terminal is not capable of automatically performing steps for repointing, the method may transition to block 860 where a determination is made whether the terminal can be repointed by the user. For example, some terminals may have modes to assist users in repointing the terminal without technician support. Where the user can repoint the terminal, the method may end at block 865 where the terminal is repointed by the user for service by the second satellite. If the terminal is not adjustable by the user, a technician may be sent to the terminal location at block 870.

Figure 9:
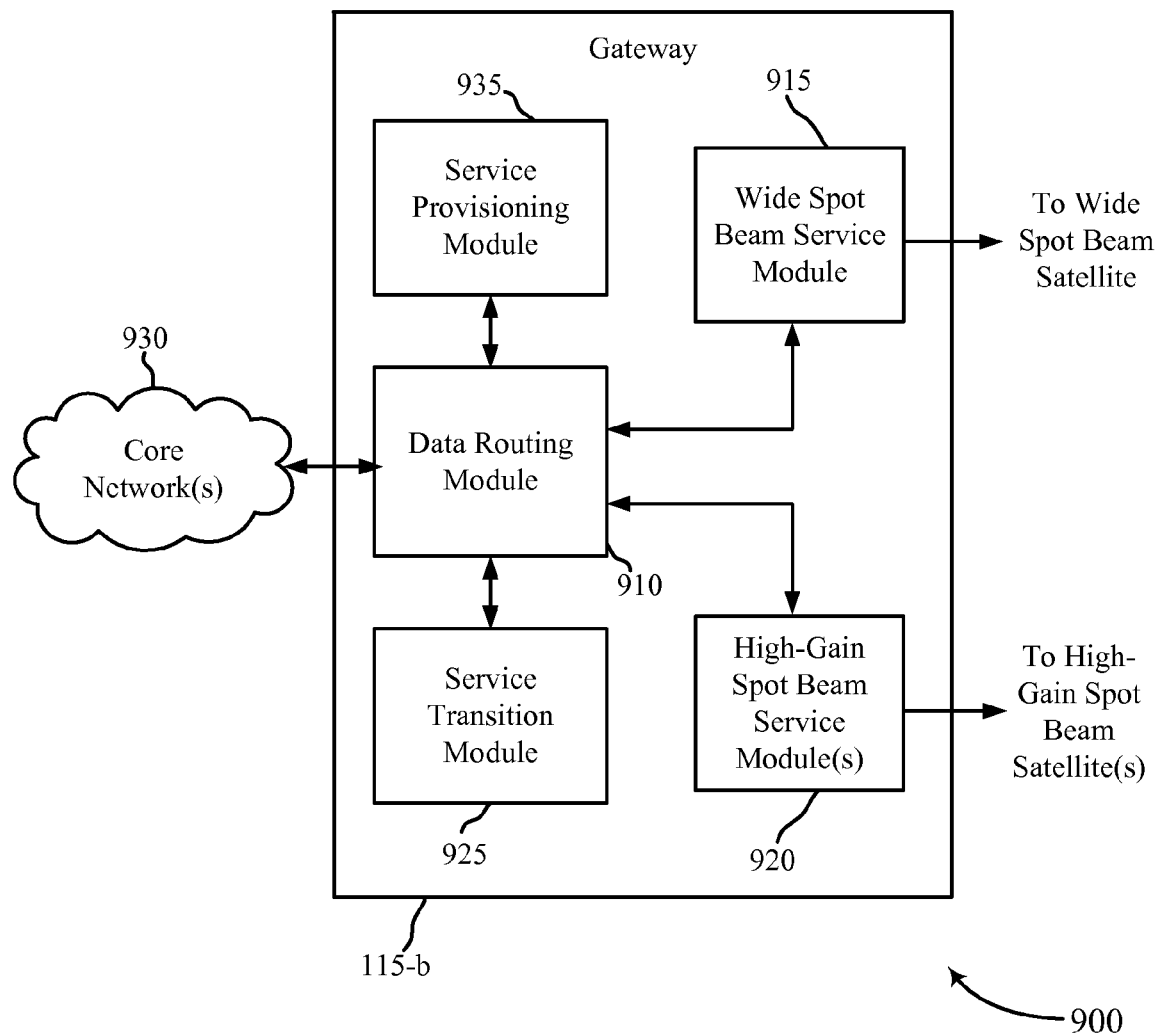
FIG. 9 is a block diagram of an example gateway system according to various embodiments of the principles described herein.

FIG. 9 illustrates a block diagram 900 of an example gateway system 115-b for managing satellite communications according to the principles of the present disclosure. The gateway system 115-b may be an example of the gateway system 115 described above with reference to FIG. 1, FIG. 3, or FIGS. 5A-5C. The gateway system 115-b of the present example includes a data routing module 910, a wide spot beam service module 915, one or more high-gain spot beam service module(s) 920, a service transition module 925, and a service provisioning module 935. Each of these components may be in communication with each other, directly or indirectly. In certain examples, the gateway system 115-b may be implemented by a single gateway device. Alternatively, the functionality of the gateway system 115-b may be spread across multiple geographically separate devices and systems. For example, the service transition module 925 may be implemented at a central core node that coordinates communication between a number of gateways and user terminals. Individual gateways may also be specific to either the first or second satellite.

The gateway system 115-b may be configured to route data between one or more core network(s) 930 and a number of terminals. The wide spot beam service module 915 may be in communication with an initially deployed multi-beam satellite, and the high-gain spot beam service module(s) 920 may be in communication with one or more later-deployed multi-beam satellites. The wide spot beam service module 915 may be configured to provide a first communication service associated with a wide spot beam of the first satellite to a first coverage area having multiple terminals. The high-gain spot beam service module 920 may be configured to provide a second communication service associated with a high-gain spot beam of the second satellite to a second coverage area, the second coverage area being located within the first coverage area. The high-gain spot beam service module 920 may further be configured to provide service using second-level high-gain spot beams (e.g., via the third satellite) to additional coverage areas located within the first coverage area and/or other coverage areas of the first and/or second satellite.

The data routing module 910 may be configured to selectively route data between the one or more core network(s) 930 and each of the terminals in the first coverage area using either the wide spot beam service module 915 or the high-gain spot beam service module(s) 920. The one or more core network(s) 930 may include content delivery networks (CDNs), IP networks of the satellite operator, the Internet, etc. Initially, the data routing module 910 may be configured to route all traffic between the terminals in the first coverage area and the one or more core networks 930 using only the wide spot beam service module 915. When the high-gain spot beam of the second satellite is deployed to the second coverage area, the service transition module 925 may update the data routing module to transition identified terminals that are located within the second coverage area from the first communication service implemented by the wide spot beam service module 915 to the second communication service implemented by the high-gain spot beam service module(s) 920.

In certain examples, the data routing module 910 may be further configured to receive a request to initiate satellite communications with at least one new terminal and route data between the network(s) and the at least one new terminal through the wide spot beam service module 915 and the first satellite in response to a determination that the at least one new terminal is located outside of the second coverage area. If the at least one new terminal is determined to be located within the second coverage area, the data routing module 910 may be configured to route data between the core network(s) 930 and the at least one new terminal through the high-gain spot beam service module 920 and the second satellite.

In certain examples, the data routing module 910 may select the wide spot beam service 915 or the high-gain spot beam service 920 for a terminal near a fringe area of the second coverage area based on signal strength or available capacity. Additionally, in certain examples, the service transition module 925 may transmit a control signal to one of the terminals located within the second coverage area to instruct the selected terminal to actuate an antenna to align the antenna with the spot beam of the second satellite.

The service provisioning module 935 may re-provision communication services or provision new communication services based on transition of terminals from the first to the second communication service. For example, the service provisioning module 935 may re-provision the first communication service for a higher service level (e.g., QoS guarantee, etc.) for all terminals that have not been transitioned to the second communication service. For example, bandwidth of the first satellite may be newly available because of transition of a number of terminals from the first communication service to the second communication service and that bandwidth can be used to re-provision the first communication service. Additionally or alternatively, the service provisioning module 935 may provision a new communication service provided via the first satellite. Terminals remaining with the first communication service may be selectively transitioned (e.g., based on consumer demand or by the direction of the system operator, etc.) to the new communication service. Provisioning or re-provisioning communication services may include updating information at the terminals or gateway for service flow control (e.g., traffic shaping, etc.).

Figure 10:
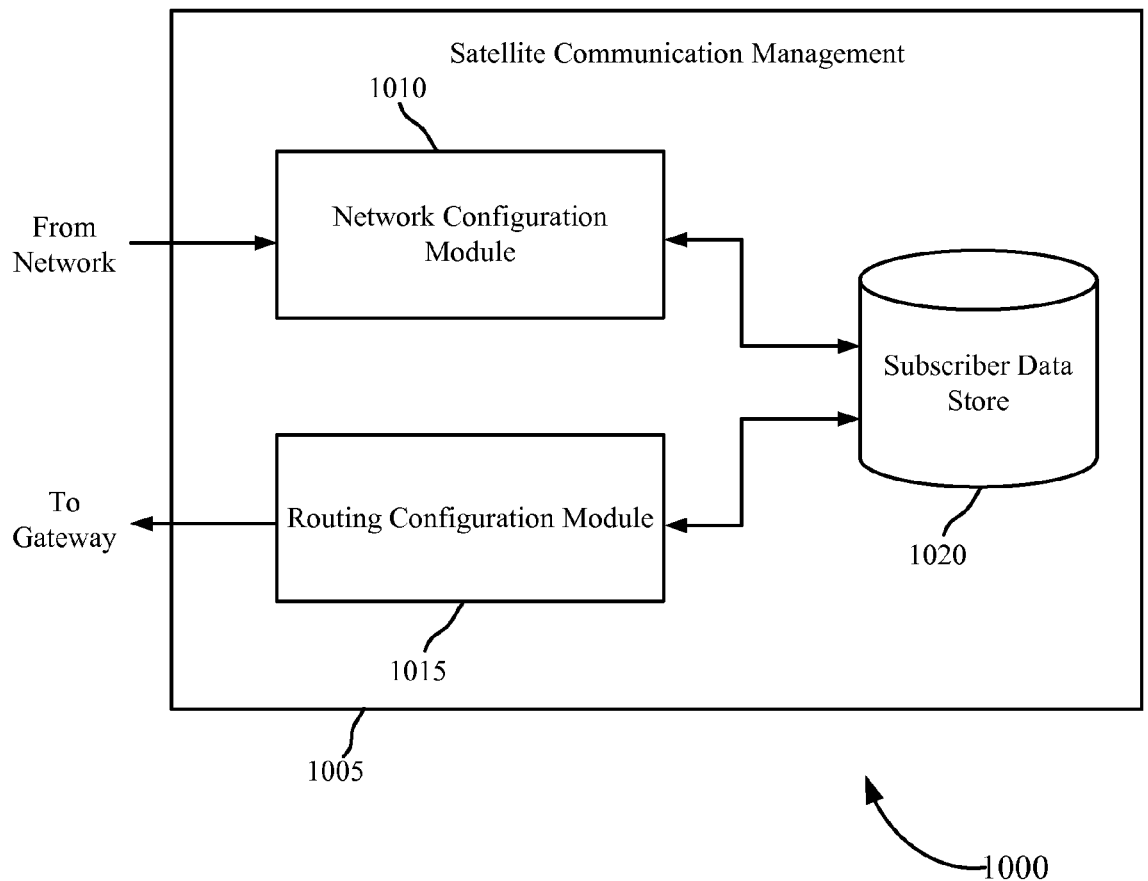
FIG. 10 is a block diagram of an example satellite communication management system according to various embodiments of the principles described herein.

FIG. 10 illustrates a block diagram of an example satellite management system 1000. The satellite communication management device 1005 may be an example of the gateway system 115 described above with respect to FIG. 1, FIG. 3, FIGS. 5A-5C, or FIG. 9. Alternatively, the satellite communication management device 1005 may be a device in communication with a gateway system over a network. The satellite communication management device 1005 of the present example includes a network configuration module 1010, a routing configuration module 1015, and a subscriber data store 1020. Each of these components may be in communication with each other, directly or indirectly.

The subscriber data store 1020 may be configured to store data associating each of a plurality of terminals with a first communication service. The terminals may be located within a coverage area of a wide spot beam served by an initially deployed first multi-beam satellite. The network configuration module 1010 may be configured to identify a subset of the terminals made up of terminals located within a coverage area of a high-gain spot beam of a later deployed second multi-beam satellite associated with a second communication service. The network configuration module 1010 may update the data of the subscriber data store 1020 to associate the terminals of the identified subset with the second communication service. The routing configuration module 1015 may be configured to cause network data to be routed between a network and each terminal using either the first communication service or the second communication service based on the data stored in the subscriber data store 1020.

In certain examples, the network configuration module 1010 may also update the routing configuration module 1015 to associate a new subscriber terminal with one of the communication services based on a number of rules. For instance, the network configuration module 1010 may identify a new terminal and update the subscriber data store 1020 to associate the new terminal with the first communication service in response to a determination that the new terminal is located outside the coverage area of the high-gain spot beam. If the new terminal is located inside the coverage area of the high-gain spot beam, the network configuration module 1010 may update the subscriber data store 1020 to associate the new terminal with the second communication service.

In additional or alternative examples, the network configuration module 1010 may determine whether one or more terminals located near fringe areas of the coverage area of the spot beam are to be associated with the first communication service or the second communication service, and update the subscriber data store 1020 accordingly.

Figure 11:
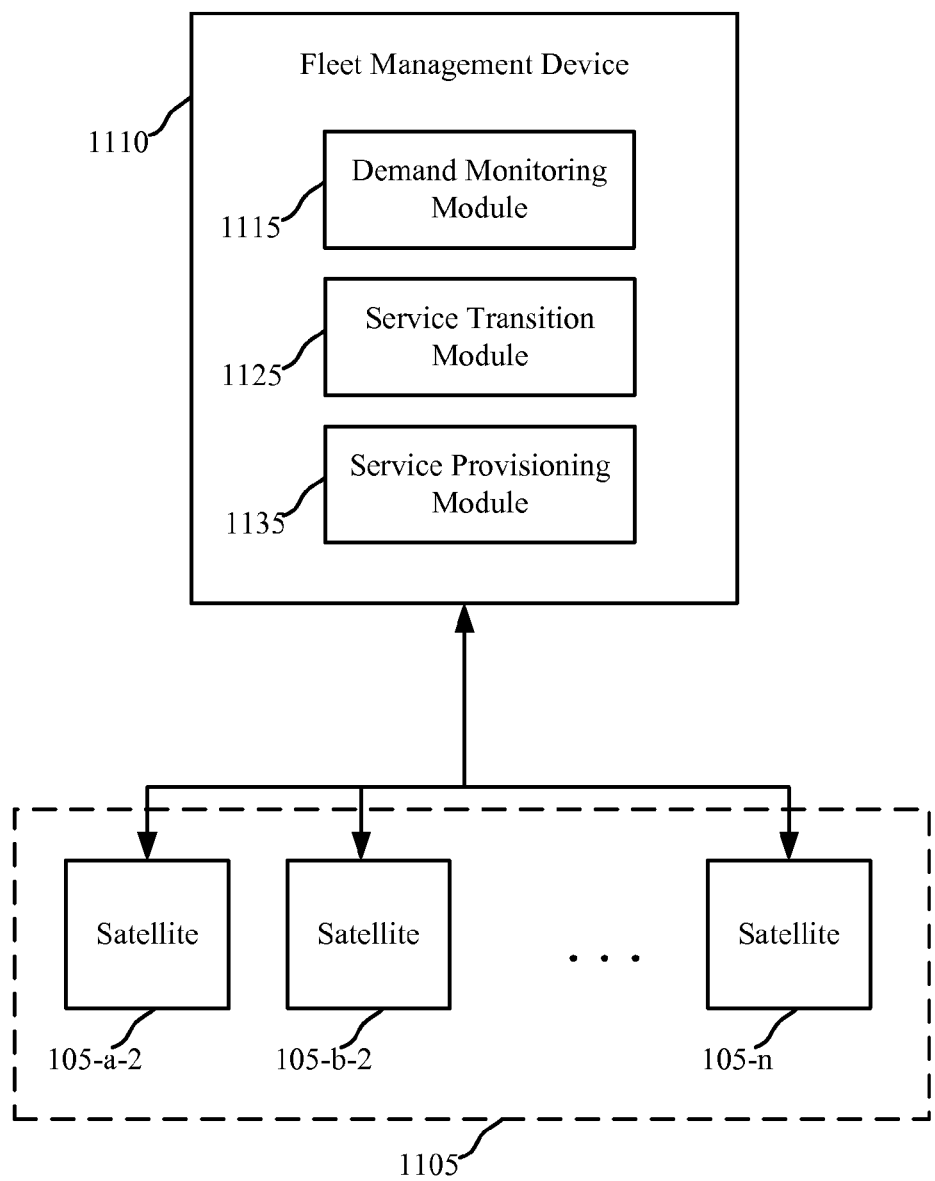
FIG. 11 is a block diagram of an example satellite fleet management system according to various embodiments of the principles described herein.

FIG. 11 illustrates a block diagram of an example system 1100 for managing deployment of a fleet 1105 of satellites 105. The system 1100 may include the fleet 1105 of satellites 105 and a fleet management device 1110 communicatively coupled with the satellites 105. The satellites 105 may be examples of the satellites 105 of one or more of the previous Figures. In certain examples, the functionality of the fleet management device 1110 may be implemented by one or more processor-based systems of one or more of the satellites 105, one or more subscribing terminals (e.g., terminals 130), one or more gateways (e.g., gateway 115), and/or one or more satellite communication management systems (e.g., satellite communication management system 1005).

The fleet management device 1110 may manage the deployment of the satellites 105 and the allocation of subscriber terminals among the different satellites 105 according to the principles described above with respect to the previous Figures. In the present example, the fleet management device 1110 may include a demand monitoring module 1115, a service transition module 1125, and a service provisioning module 1135. Each of these modules 1115, 1125, and 1135 may be in communication with each other, directly or indirectly.

The fleet 1105 of satellites 105 may include a first multi-beam satellite 105-a-2 and one or more second and/or third multi-beam satellites (e.g., satellites 105-b-2, 105-n, etc.). The first multi-beam satellite 105-a-2 may be an initially deployed satellite and may provide substantially complete coverage for a service area using tiled wide spot beams and frequency re-use (e.g., four color, etc.). The second and/or third multi-beam satellites may be later deployed satellites and may service high-gain spot beams that overlap the wide spot beams of the first satellite 105-a-2. The second and/or third satellites may re-use system resources (e.g., frequency ranges, polarizations) of the first satellite. In embodiments, high-gain spot beams of the second and/or third satellites may use a two-color frequency re-use scheme where beams use most or all of a system bandwidth and colors are separated by orthogonal polarization. Interbeam interference for high-gain spot beams from the same satellite may be managed by physical constraints on beam coverage areas (e.g., color separation for coverage regions) and/or time sharing where active beams are separated (e.g., by color and/or physically).

The demand monitoring module 1115 of the fleet management device 1110 may be configured to identify regions associated with elevated levels of satellite communication service demand. The demand monitoring module 1115 may identify terminals within the elevated demand regions that subscribe to a first communication service associated with a first beam of a first satellite 105-a-2 of the fleet 1105. The demand monitoring module 1115 may be utilized in positioning high-gain spot beams of the later deployed satellites such that coverage regions for the high-gain spot beams substantially correspond with elevated demand regions within coverage regions of the wide spot beams of the first satellite.

The service transition module 1125 may be configured to transition the terminals within the coverage area of the high-gain spot beams from the first communication service associated with the wide spot beams of the first satellite 105-a-2 to a second and/or third communication service associated with high gain spot beams of the second and/or third satellites. The terminals within the coverage area of the second beam may be transitioned upon request for the second communication service by users associated with the terminals, or the terminals of the identified subset may be transitioned at the direction of the satellite system operator.

In certain examples, the service transition module 1125 may be further configured to identify at least one new terminal located within a coverage region of a beam of the first satellite and determine whether the new terminal is located within the coverage area of a high-gain spot beam. If the new terminal is outside of the coverage area of the high-gain spot beam, the service transition module 1125 may cause the new terminal(s) to subscribe to the first communication service associated with the beam of the first satellite 105-a-2. If the new terminal is located within the coverage area of one or more high-gain beams, the service transition module 1125 may cause the new terminal to subscribe to the second communication service associated with the high-gain spot beams.

In certain examples, the service transition module 1125 may be further configured to identify one or more of the terminals that are located near a fringe area of a high-gain spot beam (e.g., of the second or third satellite) and determine whether those terminals are to receive service from a wide spot beam of the first satellite 105-a-2 or the high-gain spot beam. This decision may be made based on a comparison of the available capacity of the first satellite 105-a-2 to the available capacity of the second and/or third satellites. Additionally or alternatively, the decision may be made based on a comparison of the signal strength of each beam at the terminal device in question.

The service provisioning module 1135 may re-provision communication services or provision new communication services based on transition of terminals from the first to the second communication service. For example, the service provisioning module 1135 may re-provision the first communication service for a higher service level (e.g., QoS guarantee, etc.) for all terminals that have not been transitioned to the second communication service. For example, bandwidth of the first satellite may be newly available because of transition of a number of terminals from the first communication service to the second communication service and that bandwidth can be used to re-provision the first communication service. Additionally or alternatively, the service provisioning module 1135 may provision a new communication service provided via the first satellite. Terminals remaining with the first communication service may be selectively transitioned (e.g., based on consumer demand or by the direction of the system operator, etc.) to the new communication service. Provisioning or re-provisioning communication services may include updating information at the terminals or gateway for service flow control (e.g., traffic shaping, etc.).

Figure 12:
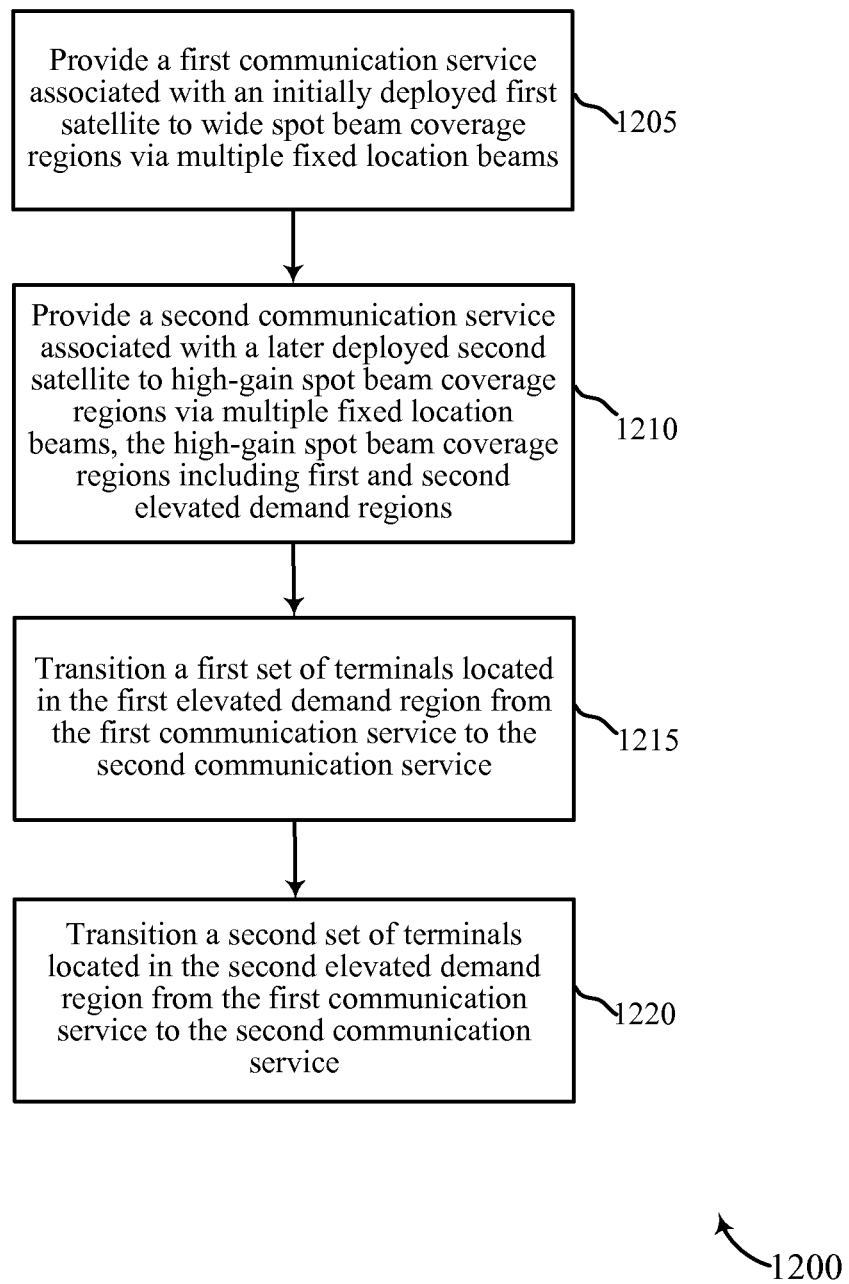
FIG. 12 is a flow chart of an example method for managing satellite communications according to various embodiments of the principles described herein.

FIG. 12 illustrates a flowchart diagram of an example method 1200 of managing satellite communications. The method 1200 may be performed, for example, by the gateway system 115 of FIG. 1, FIGS. 5A-5C, and/or FIG. 9; the subscriber terminal 130 of FIG. 1 or FIGS. 5A-5C; the satellites 105 of FIG. 1, FIG. 2, FIG. 3, FIGS. 5A-5C, and/or FIG. 11; the satellite management system 1000 of FIG. 10; and/or the fleet management device 1110 of FIG. 11.

At block 1205, a first communication service associated with an initially deployed first multi-beam satellite is provided to a wide spot beam coverage regions via a plurality of fixed location beams. For example, the first satellite may provide substantially complete coverage for a service area using tiled wide spot beams and frequency re-use (e.g., four color, etc.). At block 1210, a second communication service associated with a later deployed second multi-beam satellite is provided to a plurality of high-gain spot beam coverage regions via multiple fixed location beams of the second satellite. For example, the second satellite may be deployed after the first satellite and may provide service to coverage regions within the service area of the first satellite using multiple high-gain spot beams. The plurality of high-gain spot beam coverage regions may include a first elevated demand region located at least partially within a first wide spot beam coverage region, and a second elevated demand region located at least partially within the first and/or a second wide spot beam coverage region.

At block 1215, a first set of terminals is transitioned from the first communication service to the second communication service, the first set of terminals located in the first elevated demand region and initially associated with a first fixed location beam of the first satellite, such that the first set of terminals are then associated with a first fixed location beam of the second satellite. At block 1220, a second set of terminals is transitioned from the first communication service to the second communication service, the second set of terminals located in the second elevated demand region and initially associated with a second fixed location beam of the first satellite, such that the second plurality of terminals are then associated with a second fixed location beam of the second satellite. The first and second sets of terminals may be transitioned upon request for the second communication service by users associated with the terminals, or the terminals of the identified subset may be transitioned at the direction of the satellite system operator.

Figure 13:
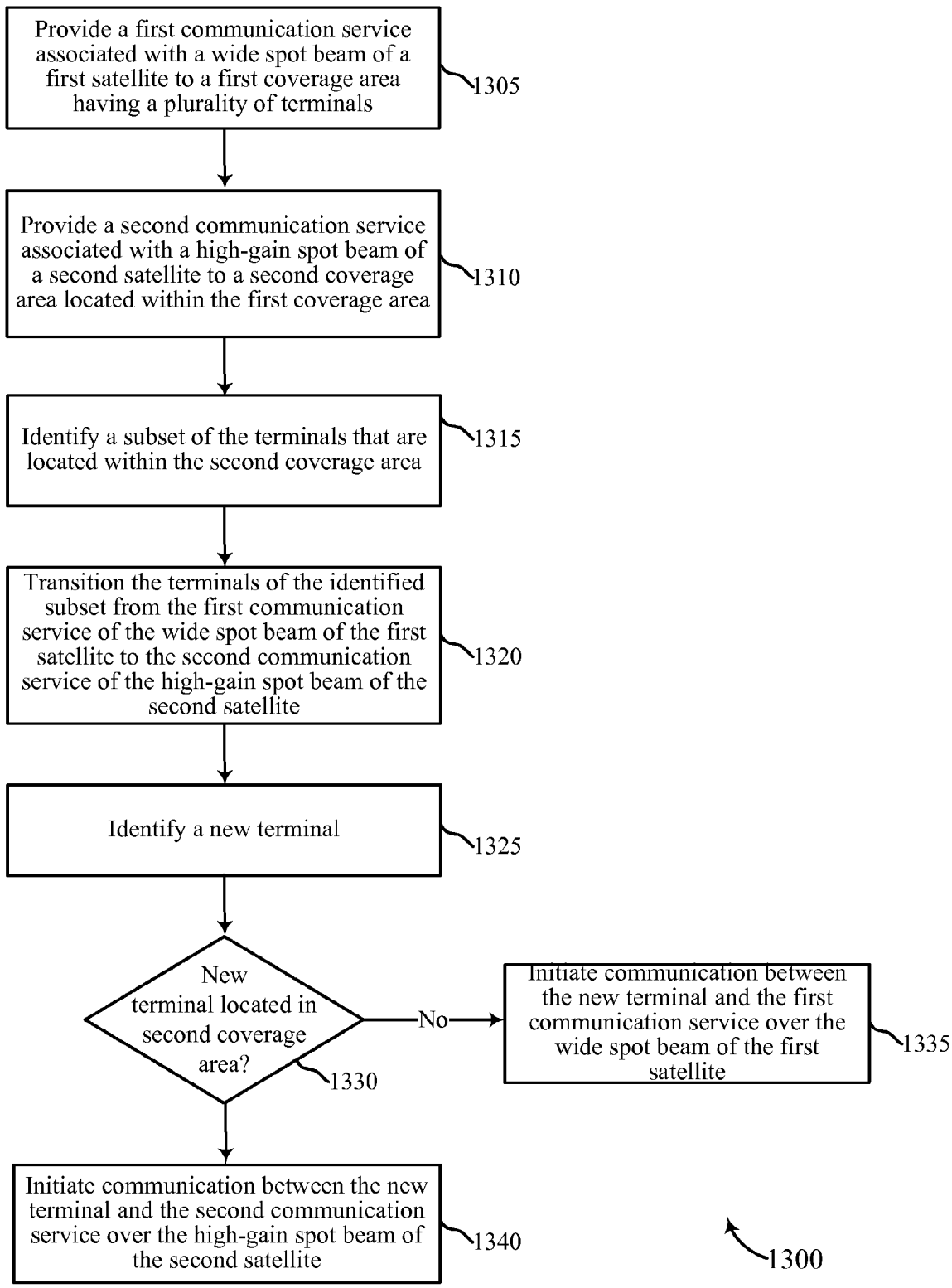
FIG. 13 is a flow chart of an example method for managing satellite communications according to various embodiments of the principles described herein.

FIG. 13 illustrates a flowchart diagram of an example method 1300 of managing satellite communications. The method 1300 may be performed, for example, by the gateway system 115 of FIG. 1, FIGS. 5A-5C, and/or FIG. 9; the subscriber terminal 130 of FIG. 1 and/or FIGS. 5A-5C; the satellites 105 of FIG. 1, FIG. 2, FIG. 3, FIGS. 5A-5C, or FIG. 11; the satellite management system 1000 of FIG. 10; and/or the fleet management device 1110 of FIG. 11.

At block 1305, a first communication service associated with a wide spot beam of a first satellite is provided to a first coverage area having a plurality of terminals. At block 1310, a second communication service associated with a high-gain spot beam of a second satellite is provided to a second coverage area located within the first coverage area. At block 1315, a subset of the terminals in the first coverage area is identified, each terminal in the subset being also located within the second coverage area. At block 1320, the terminals of the identified subset are transitioned from the first communication service of the wide spot beam of the first satellite to the second communication service of the high-gain spot beam of the second satellite.

At block 1325, a new terminal is identified. At block 1330, a determination is made of whether the new terminal is located in the second coverage area (i.e. the coverage area of the high-gain spot beam). The location of the new terminal may be determined in a number of ways. In certain examples, the terminal location may be determined manually by an installer. In additional or alternative examples, the new terminal may transmit its location to the first satellite, the second satellite, and/or a gateway or other management device associated with the first and second satellite. Additionally or alternatively, the location of the new terminal may be determined from an IP or other network address associated with the new terminal. In still other examples, the location of the new terminal may be ascertained using the Global Positioning System (GPS) or another form of triangulation.

If the new terminal is not located in the second coverage area, communication between the new terminal and the first communication service is initiated over the wide spot beam of the first satellite at block 1335. If the new terminal is located within the second coverage area, communication between the new terminal and the second communication service is initiated over the high-gain spot beam of the second satellite at block 1340.

Figure 14:
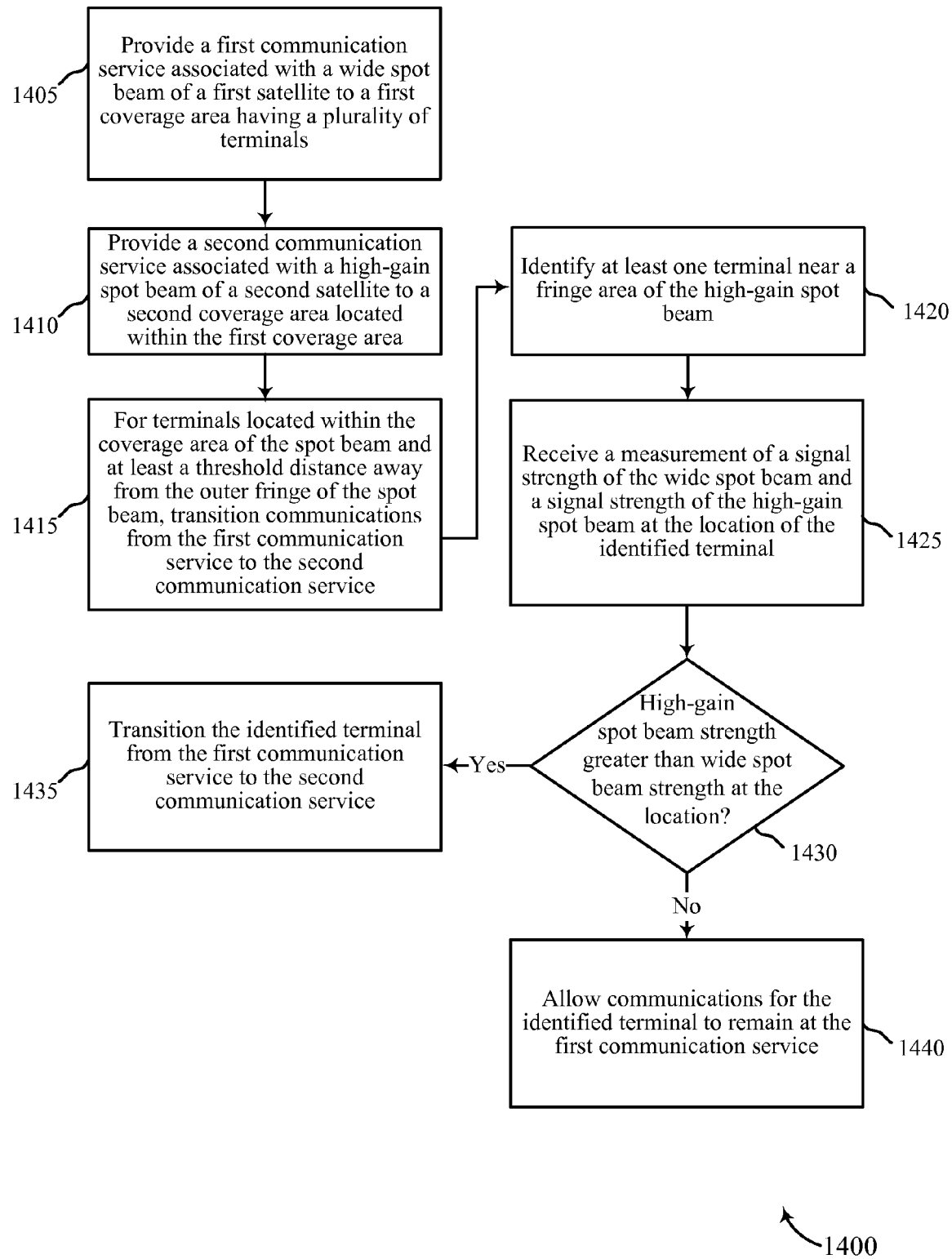
FIG. 14 is a flow chart of an example method for managing satellite communications according to various embodiments of the principles described herein.

FIG. 14 illustrates a flowchart diagram of an example method 1400 of managing satellite communications. The method 1400 may be performed, for example, by the gateway system 115 of FIG. 1, FIGS. 5A-5C, and/or FIG. 9; the subscriber terminal 130 of FIG. 1 and/or FIGS. 5A-5C; the satellites 105 of FIG. 1, FIG. 2, FIG. 3, FIGS. 5A-5C, and/or FIG. 11; the satellite management system 800 of FIG. 10; and/or the fleet management device 710 of FIG. 11.

At block 1405, a first communication service associated with a wide spot beam of a first satellite is provided to a first coverage area having a plurality of terminals. At block 1410, a second communication service associated with a high-gain spot beam of a second satellite is provided to a second coverage area located within the first coverage area. At block 1415, communications for terminals located within the coverage are of the high-gain spot beam and at least a threshold distance away from a fringe area of the high-gain spot beam are transitioned from the first communication service to the second communication service. At block 1420, at least one terminal near a fringe area of the high-gain spot beam is identified. At block 1425, a measurement of a signal strength of the wide spot beam and a signal strength of the high-gain spot beam at the location of the identified terminal are received. At block 1430, a determination is made as to whether the signal strength of the high-gain spot beam is greater than the signal strength of the wide spot beam at the location of the at least one terminal near the fringe area of the spot beam. If so (block 1430, Yes), the identified at least one terminal is transitioned from the first communication to the second communication service at block 1435. Otherwise (block 1430, No), communications for the identified terminal are allowed to remain at the first communication service at block 1440.

In additional or alternative examples, the type and configuration of hardware used by terminals at the fringes of the spot beam may influence whether each fringe terminal connects to the first communication service or the second communication service. For example, if the ability of a terminal at the fringe of the spot beam to connect to the second communication service is contingent on an upgrade or replacement of equipment at the terminal, it may be more practical for the terminal to continue communicating with the first communication service rather than transition to the second communication service.

Figure 15:
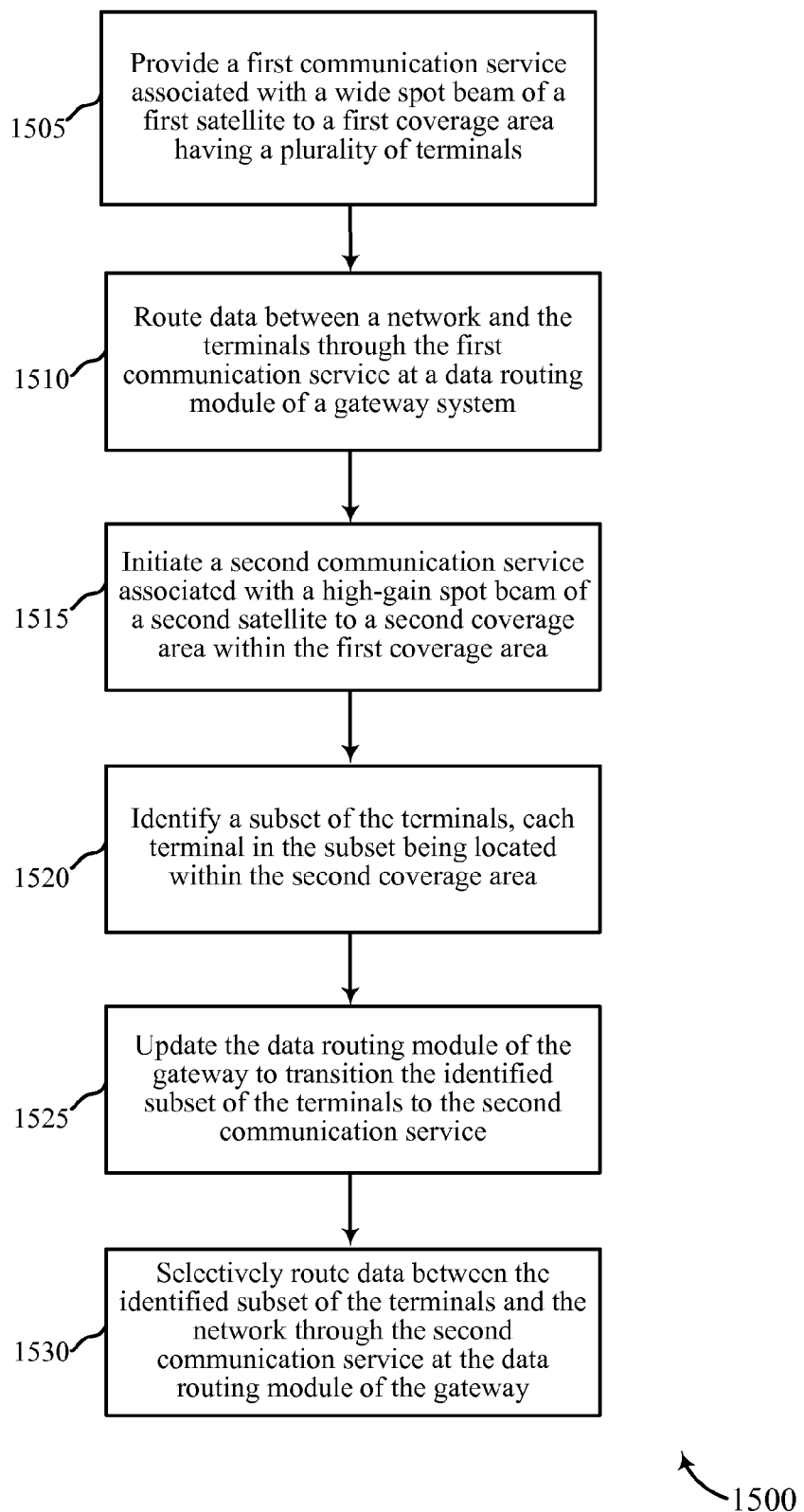
FIG. 15 is a flow chart of an example method for managing satellite communications according to various embodiments of the principles described herein.

FIG. 15 illustrates a flowchart diagram of an example method 1500 of managing satellite communications. The method 1500 may be performed, for example, by the gateway system 115 of FIG. 1, FIGS. 5A-5C, and/or FIG. 9; the subscriber terminal 130 of FIG. 1 and/or FIGS. 5A-5C; the satellites 105 of FIG. 1, FIG. 2, FIG. 3, FIGS. 5A-5C, and/or FIG. 11; the satellite management system 1000 of FIG. 10; and/or the fleet management device 1110 of FIG. 11.

At block 1505, a first communication service associated with a wide spot beam of a first satellite is provided to a first coverage area having a plurality of terminals. At block 1510, data is routed between a network and the terminals through the first communication service by a data routing module of a gateway system. At block 1515, a second communication service associated with a high-gain spot beam of a second satellite is initiated, the second communication service being directed to a second coverage area that is located within the first coverage area. At block 1520, a subset of terminals is identified, each terminal in the subset being located within the second coverage area. At block 1525, the data routing module of the gateway is updated to transition the identified subset of the terminals to the second communication service associated with the high-gain spot beam of the second satellite. Transitioning the identified subset of terminals to the second communication service may include manually, automatically, or semi-automatically repointing the identified subset of terminals (e.g., according to the method 800 illustrated in FIG. 8, etc.). At block 830, data is selectively routed between the identified subset of the terminals and the network through the second communication service at the data routing module of the gateway system.

Figure 16:
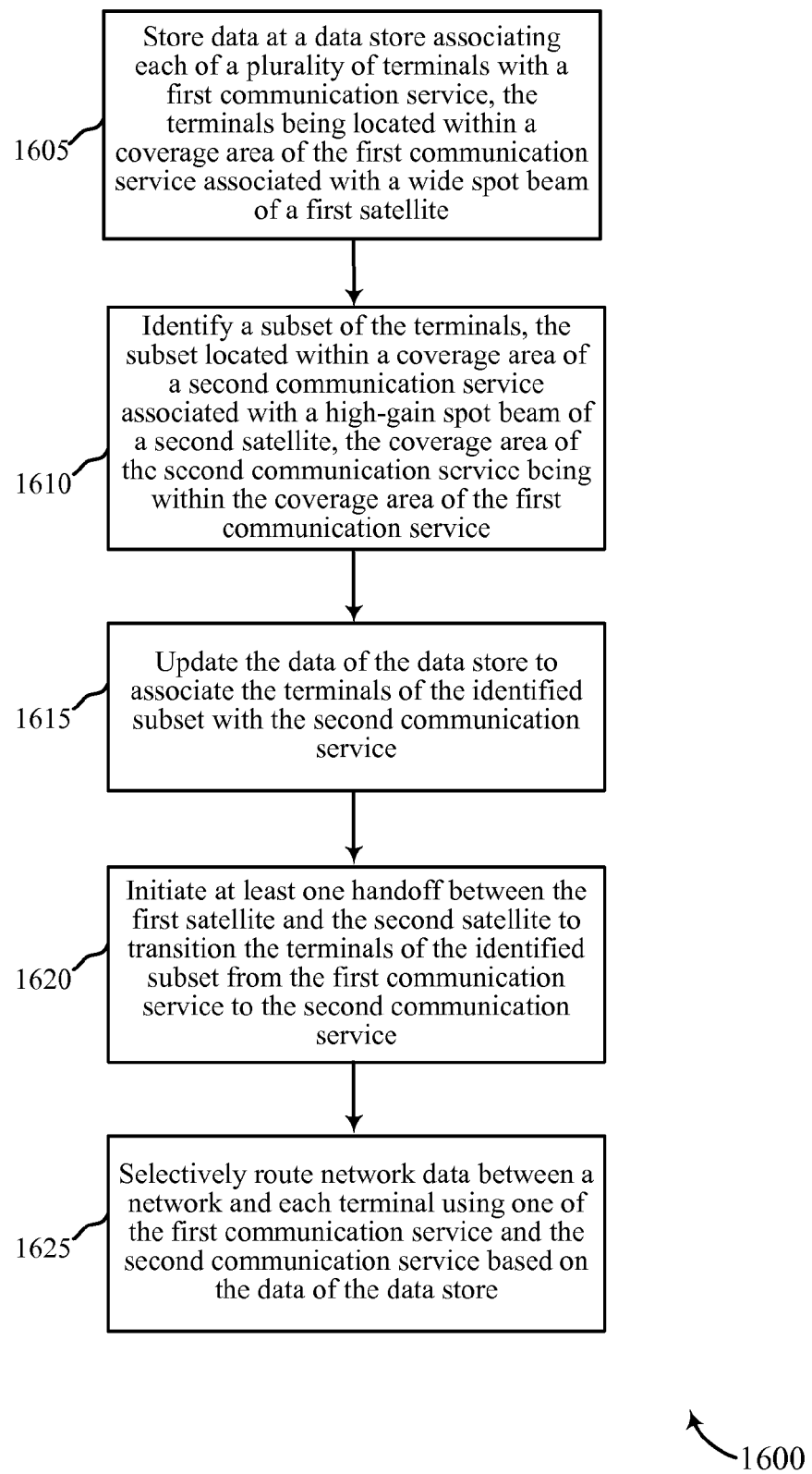
FIG. 16 is a flow chart of an example method for managing satellite communications according to various embodiments of the principles described herein.

FIG. 16 illustrates a flowchart diagram of an example method 1600 of managing satellite communications. The method 1600 may be performed, for example, by the gateway system 115 of FIG. 1, FIGS. 5A-5C, and/or FIG. 9; the subscriber terminal 130 of FIG. 1 and/or FIGS. 5A-5C; the satellites 105 of FIG. 1, FIG. 2, FIG. 3, FIGS. 5A-5C, and/or FIG. 11; the satellite management system 1000 of FIG. 10; and/or the fleet management device 1110 of FIG. 11.

At block 1605, data associating each of a plurality of terminals with a first communication service is stored at a data store. The terminals are located within a coverage area of the first communication service associated with a wide spot beam of a first satellite. At block 1610, a subset of the terminals is identified. The terminals in the subset are located within a coverage area of a second communication service associated with a spot beam of a second satellite. The coverage area of the second communication service may be within the coverage area of the first communication service. At block 1615, the data of the data store is updated to associate the terminals of the identified subset with the second communication service. At block 1620, at least one handoff (e.g., manual, automatic, or semiautomatic terminal repointing, beam weight adjustment, etc.) between the first satellite and the second satellite is initiated to transition the terminals of the identified subset from the first communication service to the second communication service. At block 1625, network data is selectively routed between a network and each terminal using one of the first communication service or the second communication service. This routing is based on the data of the data store.

Figure 17:
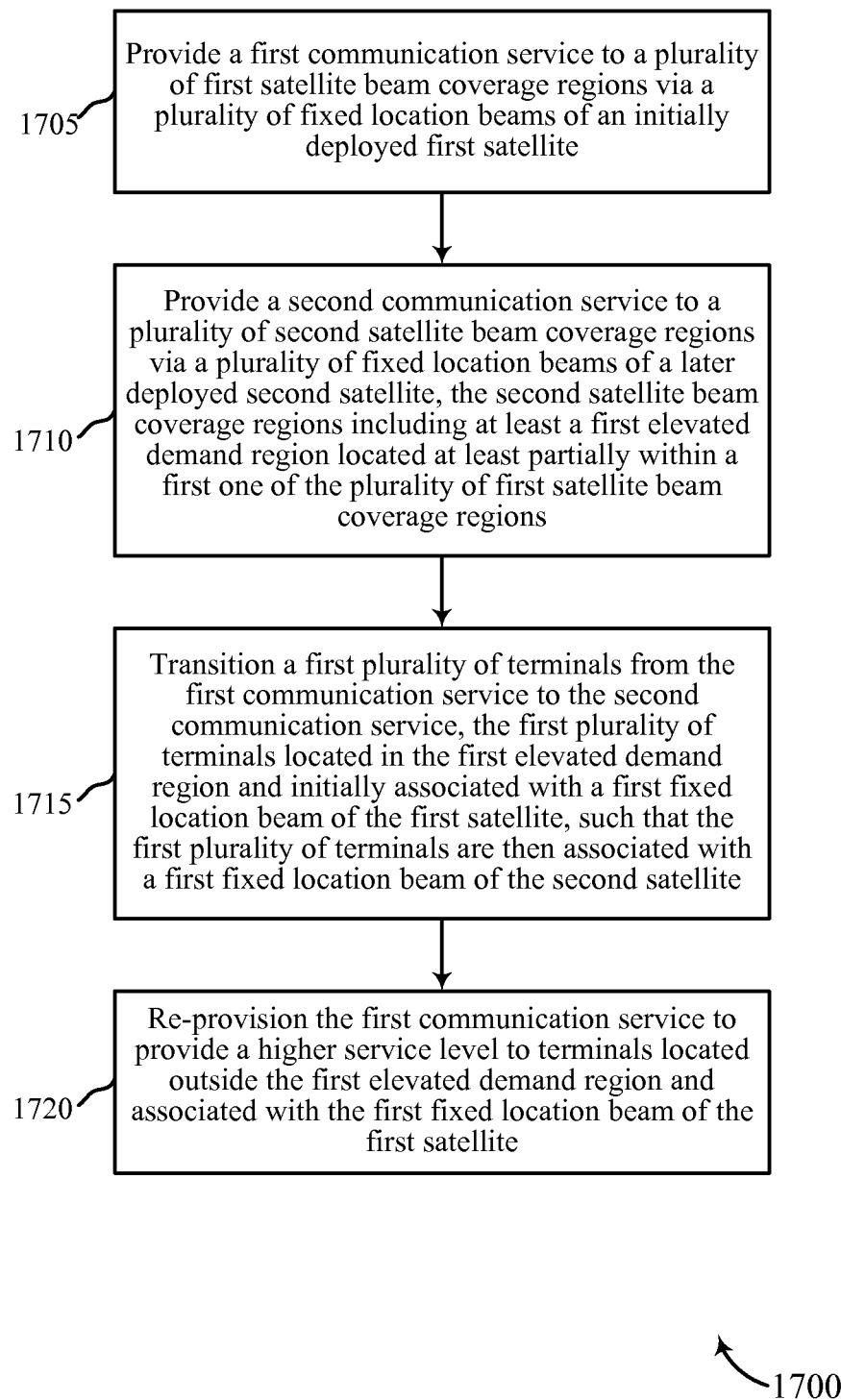
FIG. 17 is a flow chart of an example method for managing satellite communications according to various embodiments of the principles described herein.

FIG. 17 illustrates a flowchart diagram of an example method 1700 of managing satellite communications. The method 1700 may be performed, for example, by the gateway system 115 of FIG. 1, FIGS. 5A-5C, and/or FIG. 9; the subscriber terminal 130 of FIG. 1 and/or FIGS. 5A-5C; the satellites 105 of FIG. 1, FIG. 2, FIG. 3, FIGS. 5A-5C, and/or FIG. 11; the satellite management system 1000 of FIG. 10; and/or the fleet management device 1110 of FIG. 11.

At block 1705 of method 1700, a first communication service associated with an initially deployed first multi-beam satellite is provided to a wide spot beam coverage regions via a plurality of fixed location beams. For example, the first satellite may provide substantially complete coverage for a service area using tiled wide spot beams and frequency re-use (e.g., four color, etc.). At block 1710, a second communication service associated with a later deployed second multi-beam satellite is provided to a plurality of high-gain spot beam coverage regions via multiple fixed location beams of the second satellite. For example, the second satellite may be deployed after the first satellite and may provide service to coverage regions within the service area of the first satellite using multiple high-gain spot beams. The plurality of high-gain spot beam coverage regions may include a first elevated demand region located at least partially within a first wide spot beam coverage region.

At block 1715, a first set of terminals is transitioned from the first communication service to the second communication service, the first set of terminals located in the first elevated demand region and initially associated with a first fixed location beam of the first satellite, such that the first set of terminals are then associated with a first fixed location beam of the second satellite. The first set of terminals may be transitioned upon request for the second communication service by users associated with the terminals, or the terminals of the identified subset may be transitioned at the direction of the satellite system operator.

Transitioning the first set of terminals from the first communication service to the second communication service may free up substantial bandwidth resources of the first multi-beam satellite. At block 1720, the first communication service may be re-provisioned to provide a higher service level to terminals located outside the first elevated demand region and associated with the first fixed location beam of the first satellite. For example, the total bandwidth of the first fixed location beam may be divided up (using statistical multiplexing, etc.) among a lower number of current and/or expected subscribers, resulting in a higher QoS level for all terminals subscribed to the first communication service. Re-provisioning may include modifying parameters at the terminals and/or gateway to change traffic flow behavior (e.g., traffic shaping, etc.) based on the higher QoS level.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, embodiments may be implemented by hardware, software, firmware, middleware, microcode, hardware description languages, or combinations thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. A method of managing satellite communications, the method comprising:
providing a satellite data communication service to a first plurality of satellite terminals in a plurality of first satellite beam coverage regions via a plurality of fixed location beams of an initially deployed first multi-beam satellite, wherein the plurality of fixed location beams comprise resources of a system bandwidth configured in a tiled re-use pattern according to a first set of colors;
providing the satellite data communication service to a second plurality of satellite terminals in a plurality of second satellite beam coverage regions via a plurality of switched service beams of a later deployed second multi-beam satellite, wherein the plurality of second satellite beam coverage regions comprises one or more elevated demand regions located at least partially within one or more of the plurality of first satellite beam coverage regions, and wherein the plurality of switched service beams comprise resources of the system bandwidth configured according to a second set of colors; and
switching the plurality of switched service beams of the second multi-beam satellite for communications with the second plurality of satellite terminals for a plurality of time slots such that, for a set of active beams for each time slot of the plurality of time slots, beams of the plurality of switched service beams having a same color of the second set of colors are angularly separated by a color re-use separation distance.

2. The method of claim 1, wherein the plurality of switched service beams comprises a first switched service beam and a second switched service beam having respective second satellite beam coverage regions that are at least partially overlapping with each other, and wherein the switching further comprises:
switching the first switched service beam to be active for a first set of time slots of the plurality of time slots and switching the second switched service beam to be active for a second set of time slots of the plurality of time slots not overlapping with the first set of time slots.

3. The method of claim 1, further comprising:
transitioning one or more of the first plurality of satellite terminals from being serviced via the first multi-beam satellite to being serviced via the second multi-beam satellite, the one or more satellite terminals located in the one or more elevated demand regions and initially associated with a first fixed location beam of the first multi-beam satellite, such that the one or more satellite terminals are then associated with a first switched service beam of the second multi-beam satellite.

4. The method of claim 1, further comprising:
determining a first available capacity of the first multi-beam satellite and a second available capacity of the second multi-beam satellite; and
selecting one of the first multi-beam satellite and the second multi-beam satellite for servicing a satellite terminal located within the one or more elevated demand regions based on the first available capacity and the second available capacity.

5. The method of claim 1, wherein the plurality of fixed location beams are configured according to the tiled re-use pattern such that respective beams of the plurality of fixed location beams having respective first satellite beam coverage regions that are proximate with respect to each other are assigned to different colors of the first set of colors.

6. The method of claim 1, wherein the first set of colors comprises more than two orthogonal colors.

7. The method of claim 1, wherein the second set of colors comprises two or fewer orthogonal colors.

8. The method of claim 1, wherein each color of the first set of colors and the second set of colors comprises a subset of the system bandwidth or a polarization, or a combination thereof.

9. The method of claim 1, wherein each active beam of each set of active beams has a beam bandwidth comprising the system bandwidth.

10. A satellite communications system, comprising:
an initially deployed first multi-beam satellite providing a satellite data communication service to a first plurality of satellite terminals in a plurality of first satellite beam coverage regions via a plurality of fixed location beams, wherein the plurality of fixed location beams comprise resources of a system bandwidth configured in a tiled re-use pattern according to a first set of colors;
a later deployed second multi-beam satellite providing the satellite data communication service to a second plurality of satellite terminals in a plurality of second satellite beam coverage regions via a plurality of switched service beams, wherein the plurality of second satellite beam coverage regions comprises one or more elevated demand regions located at least partially within one or more of the plurality of first satellite beam coverage regions, wherein the plurality of switched service beams comprise resources of the system bandwidth configured according to a second set of colors, and wherein the second multi-beam satellite switches the plurality of switched service beams of the second multi-beam satellite for communications with the second plurality of satellite terminals for a plurality of time slots such that, for a set of active beams for each time slot of the plurality of time slots, beams of the plurality of switched service beams having a same color of the second set of colors are angularly separated by a color re-use separation distance.

11. The satellite communications system of claim 10, wherein the plurality of switched service beams comprises a first switched service beam and a second switched service beam having respective second satellite beam coverage regions that are at least partially overlapping with each other, and wherein the second multi-beam satellite switches the first switched service beam to be active for a first set of time slots of the plurality of time slots and switching the second switched service beam to be active for a second set of time slots of the plurality of time slots not overlapping with the first set of time slots.

12. The satellite communications system of claim 10, further comprising:

a fleet management device communicatively coupled to the first multi-beam satellite and the second multi-beam satellite and configured to:

transition one or more of the first plurality of satellite terminals from being serviced via the first multi-beam satellite to being serviced via the second multi-beam satellite, the one or more satellite terminals located in the one or more elevated demand regions and initially associated with a first fixed location beam of the first multi-beam satellite, such that the one or more satellite terminals are then associated with a first switched service beam of the second multi-beam satellite.

13. The satellite communications system of claim 10, further comprising:

a fleet management device communicatively coupled to the first multi-beam satellite and the second multi-beam satellite and configured to:

determine a first available capacity of the first multi-beam satellite and a second available capacity of the second multi-beam satellite; and select one of the first multi-beam satellite and the second multi-beam satellite for servicing a satellite terminal located within the one or more elevated demand regions based on the first available capacity and the second available capacity.

14. The satellite communications system of claim 10, wherein the plurality of fixed location beams are configured according to the tiled re-use pattern such that respective beams of the plurality of fixed location beams having respective first satellite beam coverage regions that are proximate with respect to each other are assigned to different colors of the first set of colors.

15. The satellite communications system of claim 10, wherein the first set of colors comprises more than two orthogonal colors.

16. The satellite communications system of claim 10, wherein the second set of colors comprises two or fewer orthogonal colors.

17. The satellite communications system of claim 10, wherein each color of the first set of colors and the second set of colors comprises a subset of the system bandwidth or a polarization, or a combination thereof.

18. The satellite communications system of claim 10, wherein each active beam of each set of active beams has a beam bandwidth comprising the system bandwidth.

19. A gateway system for managing satellite communications, comprising:

a first beam service module in communication with an initially deployed first multi-beam satellite providing a satellite data communication service to a first plurality of satellite terminals in a plurality of first satellite beam coverage regions via a plurality of fixed location beams, wherein the plurality of fixed location beams comprise resources of a system bandwidth configured in a tiled re-use pattern according to a first set of colors;

a second beam service module in communication with a later deployed second multi-beam satellite providing the satellite data communication service to a second plurality of satellite terminals in a plurality of second satellite beam coverage regions via a plurality of switched service beams, wherein the plurality of second satellite beam coverage regions comprises one or more elevated demand regions located at least partially within one or more of the plurality of first satellite beam coverage regions, wherein the plurality of switched service beams comprise resources of the system bandwidth configured according to a second set of colors, and wherein the second multi-beam satellite switches the plurality of switched service beams of the second multi-beam satellite for communications with the second plurality of satellite terminals for a plurality of time slots such that, for a set of active beams for each time slot of the plurality of time slots, beams of the plurality of switched service beams having a same color of the second set of colors are angularly separated by a color re-use separation distance; and a data routing module configured to selectively route data between a network, the first beam service module and the second beam service module.

20. The gateway system of claim 19, further comprising:

a fleet management device communicatively coupled to the first beam service module and the second beam service module configured to:

transition one or more of the first plurality of satellite terminals from being serviced via the first multi-beam satellite to being serviced via the second multi-beam satellite, the one or more satellite terminals located in the one or more elevated demand regions and initially associated with a first fixed location beam of the first multi-beam satellite, such that the one or more satellite terminals are then associated with a first switched service beam of the second multi-beam satellite.

\* \* \* \* \*